US012666409B2

(12) United States Patent
Takeda et al.

(10) Patent No.: US 12,666,409 B2
(45) Date of Patent: Jun. 23, 2026

(54) USER TERMINAL

(71) Applicant: NTT DOCOMO, INC., Tokyo (JP)

(72) Inventors: Kazuki Takeda, Tokyo (JP); Satoshi Nagata, Tokyo (JP); Lihui Wang, Beijing (CN); Shaozhen Guo, Beijing (CN); Xiaolin Hou, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 396 days.

(21) Appl. No.: 17/261,384

(22) PCT Filed: Jul. 20, 2018

(86) PCT No.: PCT/JP2018/027393
§ 371 (c)(1),
(2) Date: Jan. 19, 2021

(87) PCT Pub. No.: WO2020/017054
PCT Pub. Date: Jan. 23, 2020

(65) Prior Publication Data
US 2021/0266902 A1      Aug. 26, 2021

(51) Int. Cl.
*H04W 72/0453* (2023.01)
*H04W 72/0446* (2023.01)

(52) U.S. Cl.
CPC ... *H04W 72/0453* (2013.01); *H04W 72/0446* (2013.01)

(58) Field of Classification Search
CPC ......... H04W 72/0445; H04W 72/0453; H04W 72/0446; H04W 52/0229; H04W 16/04;
(Continued)

(56) References Cited

U.S. PATENT DOCUMENTS

2016/0270061 A1* 9/2016 Dinan .................... H04W 48/12
2018/0359068 A1* 12/2018 Kim ...................... H04W 72/14
(Continued)

FOREIGN PATENT DOCUMENTS

JP        2018-041993 A      3/2018
KR        2017-0121425   *  9/2017
WO         2016121637 A1    8/2016

OTHER PUBLICATIONS

LTE; Evolved Universal Terrestrial Radio Access (E-UTRA); Physical layer procedures, Apr. 2017, 3rd Generation Partnership Project, TS 136.213 V14.2.0 Release 13, p. 12-15 (Year: 2017).*
(Continued)

*Primary Examiner* — Noel R Beharry
*Assistant Examiner* — Angelie T Ngo
(74) *Attorney, Agent, or Firm* — Osha Bergman Watanabe & Burton LLP

(57) ABSTRACT

In order to, in future radio communication systems, appropriately control activation and deactivation timings of an SCell, even in a case that whichever subcarrier spacing is configured on any carrier, an aspect of a user terminal according to the present disclosure includes a receiving section that receives an activation command or deactivation command for a certain cell, and a control section that applies, at a timing independent of a subcarrier spacing of a carrier on which the activation command or deactivation command is transmitted, an operation corresponding to reception of the activation command and deactivation.

3 Claims, 14 Drawing Sheets

(58) Field of Classification Search
CPC .... H04W 56/001; H04W 76/15; Y02D 30/70;
H04L 5/0007; H04L 5/001; H04L 5/0098;
H04L 27/26025
See application file for complete search history.

(56) References Cited

U.S. PATENT DOCUMENTS

| 2019/0132793 | A1* | 5/2019 | Lin | H04W 52/0206 |
| 2019/0141695 | A1* | 5/2019 | Babaei | H04W 56/0045 |
| 2019/0149308 | A1* | 5/2019 | Son | H04L 5/0007 |
| | | | | 375/260 |
| 2019/0215136 | A1* | 7/2019 | Zhou | H04L 1/1819 |
| 2020/0022095 | A1* | 1/2020 | Kim | H04W 72/56 |
| 2020/0045684 | A1* | 2/2020 | Futaki | H04L 5/0051 |

OTHER PUBLICATIONS

3GPP, 5G; NR; Requirements for support of radio resource management, Jul. 8, 2018, ETSI, TS 138.133 V15.2.0, p. 43-45 (Year: 2018).*
International Search Report issued in PCT/JP2018/027393 mailed on Oct. 2, 2018 (1 page).

Written Opinion of the International Searching Authority issued in PCT/JP2018/027393 mailed on Oct. 2, 2018 (5 pages).
Huawei, HiSilicon; "UL control channesl for CA and DC"; 3GPP TSG RAN WG1 Meeting #87, R1-1611653; Reno, USA; Nov. 14-18, 2016 (3 pages).
3GPP TS 38.211 V15.2.0; "3rd Generation Partnership Project; Technical Specification Group Radio Access Network; NR: Physical channels and modulation (Release 15)"; Jun. 2018 (5 pages).
3GPP TS 38.213 V15.2.0; "3rd Generation Partnership Project; Technical Specification Group Radio Access Network; NR; Physical layer procedures for control (Release 15)"; Jun. 2018 (17 pages).
ETSI TS 136 321 V13.7.0; "LTE; Evolved Universal Terrestrial Radio Access (E-UTRA); Medium Access Control (MAC) protocol specification (3GPP TS 36.321 version 13.7.0 Release 13)"; Oct. 2017; (96 pages).
Extended European Search Report issued in European Application No. 18926894.9, dated Jan. 26, 2022 (6 pages).
Office Action issued in Japanese Application No. 2020-530866; Dated Sep. 27, 2022 (6 pages).
Office Action issued in Japanese Application No. 2020-530866; Dated Mar. 28, 2023 (9 pages).
Office Action issued in Chinese Application No. 201880097817.1; Dated Jul. 28, 2023 (28 pages).

* cited by examiner

START TIME OF SCell ACTIVATION/DEACTIVATION
BASED ON TIME DOMAIN RESOURCE ALLOCATION START TIME OF SCell ACTIVATION/DEACTIVATION
BASED ON TIME DOMAIN RESOURCE ALLOCATION

USER TERMINAL

TECHNICAL FIELD

The present invention relates to a user terminal in next-generation mobile communication systems.

BACKGROUND ART

In existing LTE systems (for example, Rel. 13), in carrier aggregation (CA), a base station uses a MAC (Mediums Access Control) control element (CE) to perform control in order to activate a secondary cell (SCell) from a deactive state for a user terminal (UE (User Equipment) (Non-Patent Literature 1).

Once the user terminal receives an activation command for an SCell in a subframe n, the user terminal activates the SCell until a subframe a certain period after the subframe n (for example, a subframe (n+8)).

CITATION LIST

Non-Patent Literature

Non-Patent Literature 1: 3GPP TS 36.321 V13.7.0 "Evolved Universal Terrestrial Radio Access (E-UTRA); Medium Access Control (MAC) protocol specification (Release 13)," September, 2017

SUMMARY OF INVENTION

Technical Problem

In future radio communication systems (for example, Rel. 15), timings of activation and deactivation (activation/deactivation) of the SCell are defined using a slot as a reference.

In the carrier aggregation in the future radio communication systems (for example, NR (New Radio)), a subcarrier spacing may be different between an SCell and a PCell (Primary Cell), for example. In this case, it may not be determined which carrier includes a slot to be used as a reference to decide the activation and deactivation timings of the SCell.

The present invention has been made in view of the above, and has an object to provide a user terminal capable of appropriately controlling activation and deactivation timings of an SCell, even in a case that whichever subcarrier spacing is configured on any carrier, in the future radio communication systems.

Solution to Problem

An aspect of a user terminal according to the present invention includes a receiving section that receives an activation command or deactivation command for a certain cell, and a control section that applies, at a timing independent of a subcarrier spacing of a carrier on which the activation command or deactivation command is transmitted, an operation corresponding to reception of the activation command and deactivation.

Advantageous Effects of Invention

According to the present invention, it is possible to appropriately control activation and deactivation timings of an SCell, even in a case that whichever subcarrier spacing is configured on any carrier, in the future radio communication systems.

DESCRIPTION OF EMBODIMENTS

Figure 1:
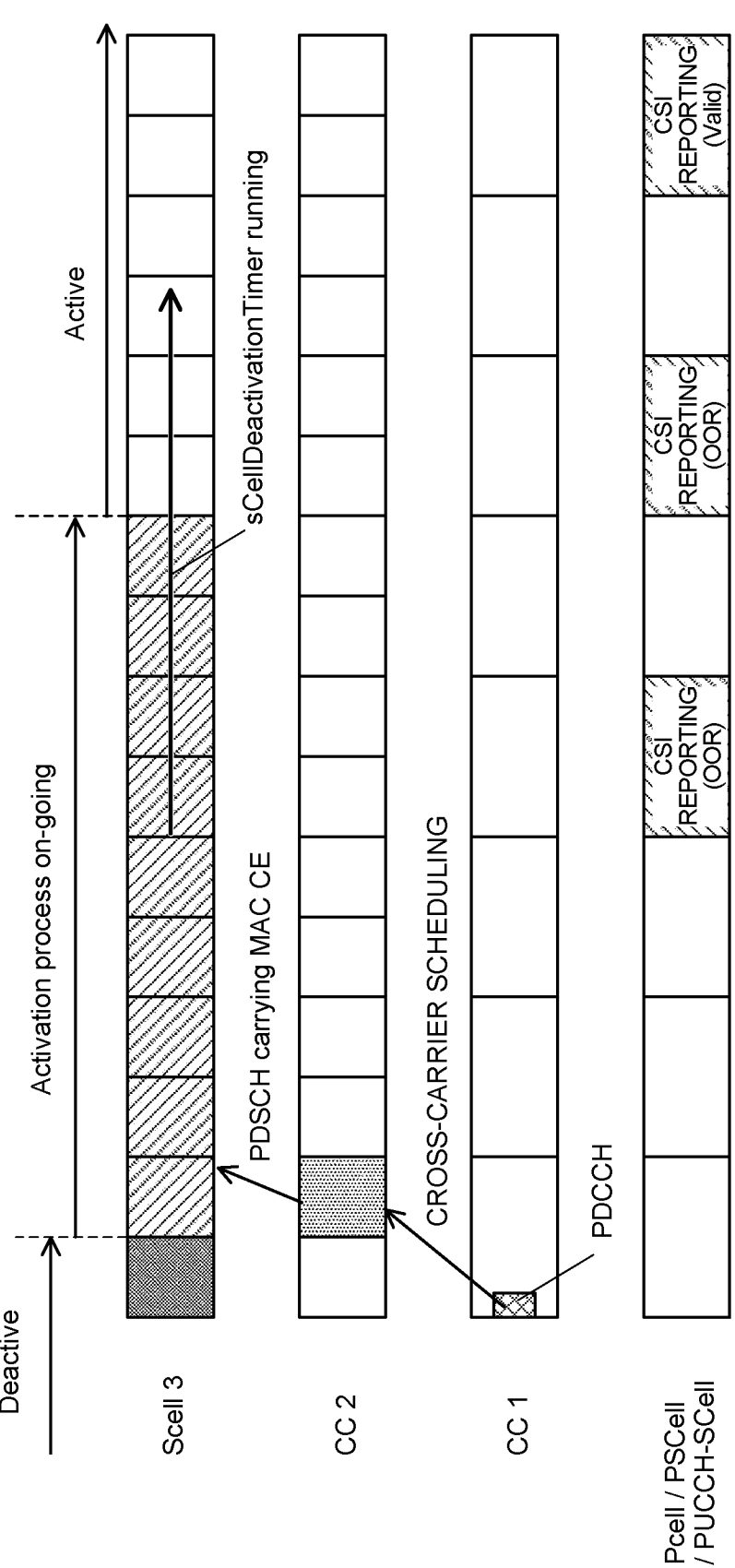
FIG. 1 is a diagram to show an example of a plurality of carriers that are configured with carrier aggregation and are different in subcarrier spacing in a future radio communication system.

In carrier aggregation in existing LTE systems (for example, Rel. 13), signaling by use of a MAC CE is used to activate an SCell from a deactive state. The MAC CE includes information about the activation of each SCell.

In a case that a user terminal receiving a MAC CE indicating activation of an SCell, the user terminal configures, as an active cell, the SCell configured to be activated by way of the MAC CE. The user terminal can perform, with respect to the SCell configured to be activated by way of the MAC CE, operations such as transmitting a sounding reference signal (SRS) in the SCell, reporting channel quality information (CQI (Channel Quality Indicator), precoding matrix information (PMI (Precoding Matrix Indicator), rank information (RI (Rank Indicator)), or precoding type information (PTI (Precoding Type Indicator)) to the SCell, transmitting an uplink control channel (PUCCH (Physical Uplink Control Channel)) in the SCell, transmitting a RACH (Random Access Channel) in the SCell, monitoring a downlink control channel (PDCCH (Physical Downlink Control Channel) in the SCell, and monitoring a PDCCH for the SCell.

In the case that the user terminal receiving a MAC CE indicating activation of an SCell, the user terminal starts or restarts an SCell deactivation timer (sCellDeactivationTimer) associated with the SCell configured to be activated by way of the MAC CE.

In a case that the user terminal receives a MAC CE indicating deactivation of an SCell, or in a case that the SCell deactivation timer (sCellDeactivationTimer) expires, the user terminal configures, as a deactive cell, the SCell configured to be deactivated by way of the MAC CE.

In the future radio communication systems (for example, Rel. 15), it is defined that in a case that the user terminal receives an activation command for an SCell (for example, a MAC CE indicating activation of the SCell) in a slot n in a certain cell, corresponding operations except for an operation 1 to an operation 3 described below should be applied not later than a defined minimum requirement and not earlier than in a slot (n+k).

The operation 1 is an operation related to CSI reporting of a serving cell that is active in the slot (n+k).

The operation 2 is an operation related to an SCell deactivation timer (sCellDeactivationTimer) associated with the SCell applied in the slot (n+k).

The operation 3 is an operation that is related to CSI reporting of a serving cell not active in the slot (n+k), and that is applied in a slot which is first after the slot (n+k) and in which the serving cell is activated.

As the "corresponding operation" applied in a case that the SCell is activated in response to the activation command for the SCell, the user terminal may apply any operation of transmitting the SRS in the SCell, the CSI reporting to the SCell, monitoring the PDCCH in the SCell, monitoring the PDCCH for the SCell, and transmitting the PUCCH in the SCell.

It is defined that in a case that the user terminal receives a deactivation command for an SCell (for example, a MAC CE indicating deactivation of the SCell) in the slot n, or in a case that an SCell deactivation timer (sCellDeactivationTimer) associated with the SCell expires, a corresponding operation, except for the operation related to CSI reporting of an active serving cell applied in the slot (n+k), should be applied not later than the defined minimum requirement.

As the "corresponding operation" applied in the case that the SCell is deactivated in response to the deactivation command for the SCell, the user terminal may apply any operation of not transmitting the SRS in the SCell, not transmitting the CSI for the SCell, not transmitting a UL-SCH (UL data, UL transport channel) in the SCell, not transmitting the RACH in the SCell, not monitoring the PDCCH in the SCell, not monitoring the PDCCH for the SCell, and not transmitting the PUCCH in the SCell.

In this manner, in the future radio communication systems (for example, Rel. 15), the timings of activation and deactivation (activation/deactivation) of the SCell are defined using a slot as a reference.

In the carrier aggregation in the future radio communication systems (for example, NR), a subcarrier spacing (SCS) may be different between the SCell and the PCell, for example. In this case, it may not be determined which carrier includes a slot to be used as a reference to decide the activation and deactivation timings of the SCell.

FIG. 1 is a diagram to show an example of a plurality of carriers that are configured with carrier aggregation and are different in subcarrier spacing in a future radio communication system (for example, NR). In the example shown in FIG. 1, there are up to four candidates that are taken as a definition of the slot.

A first candidate is a slot in a carrier (a component carrier (CC) 1 in FIG. 1) carrying a downlink control channel (PDCCH) that schedules a downlink shared channel (PDSCH (Physical Downlink Shared Channel)) carrying a MAC CE including an activation command or deactivation command for the SCell.

A second candidate is a slot in a carrier (a CC 2 in FIG. 1) carrying the downlink shared channel (PDSCH) carrying the MAC CE including the activation command or deactivation command for the SCell.

A third candidate is a slot in a carrier (PCell, PSCell (Secondary Primary Cell), PUCCH-SCell in FIG. 1) carrying an uplink control channel (PUCCH) or uplink shared channel (PUSCH (Physical Uplink Shared Channel)) that carries CSI reporting of the SCell activated by way of the MAC CE.

A fourth candidate is a slot in an SCell (an SCell 3 in FIG. 1) to be activated by way of the MAC CE including the activation command or deactivation command for the SCell.

As such, the inventors of the present invention have specifically studied the timings of the activation and deactivation (activation/deactivation) of the SCell in a plurality of carriers that are configured with carrier aggregation and are different in subcarrier spacing in the future radio communication systems (for example, NR).

Hereinafter, the present embodiment will be described with reference to the accompanying drawings.

In the present embodiment, terms related to an active state (for example, activation, activate, active, validation, energization, and the like) may be interpreted as terms related to a deactive state (for example, deactivation, deactivate, deactive, invalidation, deenergization, break, inactive, release, and the like). The "activation/deactivation of SCell" may be interpreted as at least one of the activation and deactivation of the SCell.

(First Aspect)

A first aspect describes an aspect in which the activation/deactivation timing of the SCell is processed in a requirement at a millisecond (ms) level independent of a subcarrier spacing of a carrier.

(Aspect 1-1)

Even in a case that whichever subcarrier spacing is configured on any carrier, for example, the operations related to the CSI reporting and the SCell deactivation timer (sCellDeactivationTimer) may be started after k [ms] from when an activation command for the SCell is received, specifically, in a slot which is first after k [ms] from when the activation command for the SCell is received.

Here, a slot is based on a subcarrier spacing of the SCell to be activated. Alternatively, a slot is based on a subcarrier spacing of a cell carrying the CSI reporting, for example, the PCell, the PSCell, or the PUCCH-SCell.

In a case that the user terminal receives an activation command for an SCell (for example, a MAC CE indicating activation of the SCell) in a slot n, a corresponding operation except for an operation 1 to an operation 3 described below may be applied not later than the defined minimum requirement and not earlier than after k [ms] from when the activation command for the SCell is received.

The operation 1 is an operation related to CSI reporting of an active serving cell in a slot which is first after k [ms] from when the activation command for the SCell is received.

The operation 2 is an operation that is related to an SCell deactivation timer (sCellDeactivationTimer) associated with the SCell, and that is applied in a slot which is first after k [ms] from when the activation command for the SCell is received.

The operation 3 is an operation that is related to CSI reporting of a serving cell not active in a slot which is first after k [ms] from when the activation command for the SCell is received, and that is applied in the slot which is first after k [ms] from when the activation command for the SCell is received and in which the serving cell is activated.

As the "corresponding operation" applied in a case that the SCell is activated in response to the activation command for the SCell, the user terminal may apply any operation of transmitting the SRS in the SCell, the CSI reporting to the SCell, monitoring the PDCCH in the SCell, monitoring the PDCCH for the SCell, and transmitting the PUCCH in the SCell.

In a case that the user terminal receives a deactivation command for an SCell (for example, a MAC CE indicating deactivation of the SCell) in the slot n, or in a case that an SCell deactivation timer (sCellDeactivationTimer) associated with the SCell expires, a corresponding operation, except for the operation related to CSI reporting of an active serving cell in a slot which is first after k [ms] from when the activation command for the SCell is received, may be applied not later than the defined minimum requirement.

As the "corresponding operation" applied in the case that the SCell is deactivated in response to the deactivation command for the SCell, the user terminal may apply any operation of not transmitting the SRS in the SCell, not transmitting the CSI for the SCell, not transmitting a UL-SCH (UL data, UL transport channel) in the SCell, not transmitting the RACH in the SCell, not monitoring the PDCCH in the SCell, not monitoring the PDCCH for the SCell, and not transmitting the PUCCH in the SCell.

Figure 2:
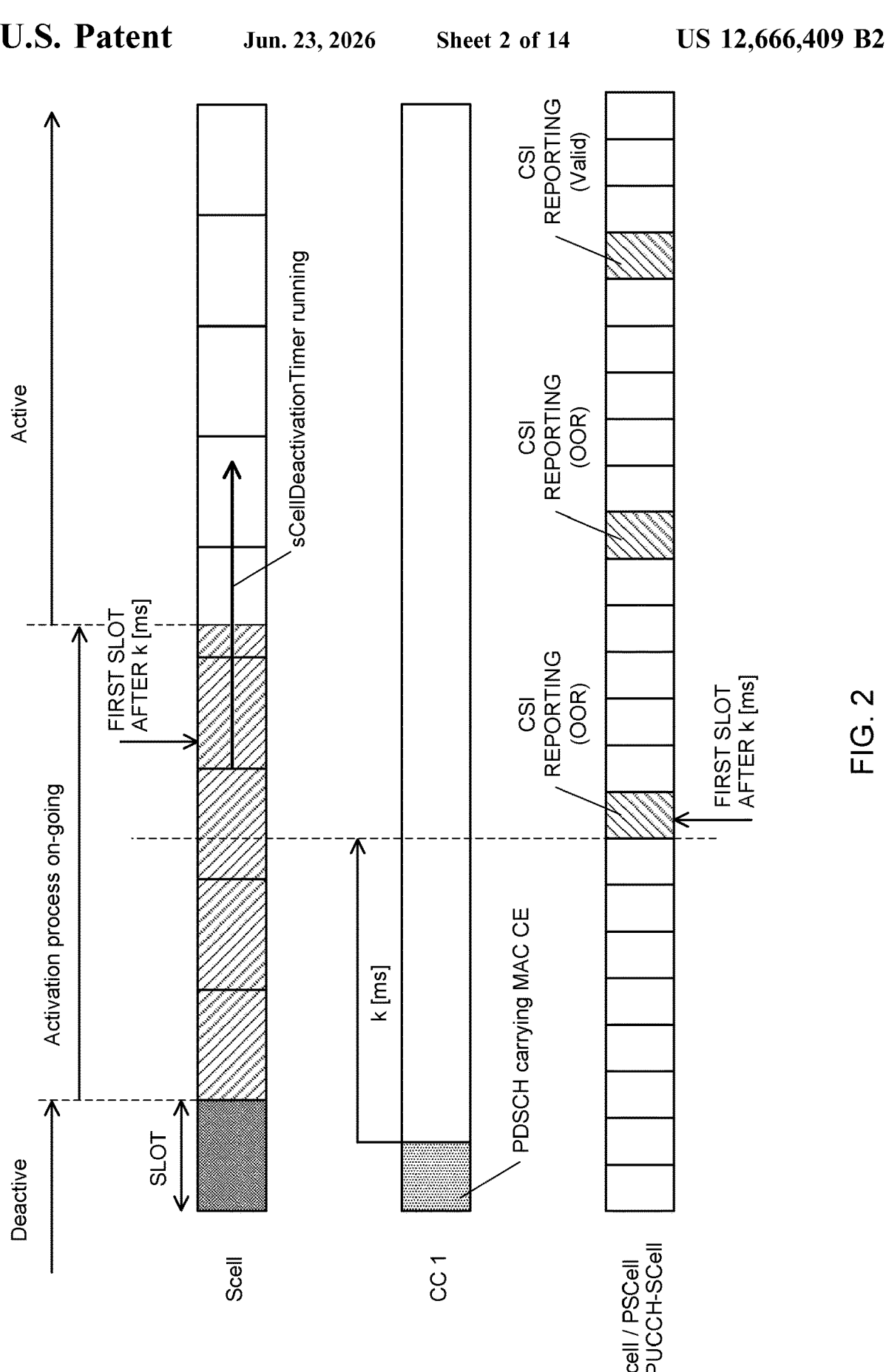
FIG. 2 is a diagram to show an example of an SCell activation/deactivation timing corresponding to Aspect 1-1 in a plurality of carriers that are configured with carrier aggregation and are different in subcarrier spacing.

FIG. 2 is a diagram to show an example of an SCell activation/deactivation timing corresponding to Aspect 1-1 in a plurality of carriers that are configured with carrier aggregation and are different in subcarrier spacing in a future radio communication system (for example, NR).

As shown in FIG. 2, a PDSCH carrying the MAC CE including the activation command for the SCell is carried in a certain slot in the CC 1, and the user terminal receives the PDSCH.

The user terminal starts the operation related to the SCell deactivation timer (sCellDeactivationTimer) in the slot which is first after k [ms] from when receiving the activation command for the SCell. Here, the slot is based on a subcarrier spacing of the SCell to be activated.

The user terminal starts the CSI reporting in the slot which is first after k [ms] from when receiving the activation command for the SCell. The slot is based on a subcarrier spacing of a cell carrying the CSI reporting, for example, the PCell, the PSCell, or the PUCCH-SCell.

(Aspect 1-2)

Even in a case that whichever subcarrier spacing is configured on any carrier, for example, the operations related to the CSI reporting and the SCell deactivation timer (sCellDeactivationTimer) may be started after k [ms] from when an activation command for the SCell is received, specifically, in a subframe which is first after k [ms] from when the activation command for the SCell is received.

In a case that the user terminal receives an activation command for an SCell (for example, a MAC CE indicating activation of the SCell) in a slot n in a subframe i, a corresponding operation except for an operation 1 to an operation 3 described below may be applied not later than the defined minimum requirement and not earlier than in the first slot in a subframe (i+k).

The operation 1 is an operation related to CSI reporting of an active serving cell in the first slot in the subframe (i+k).

The operation 2 is an operation that is related to an SCell deactivation timer (sCellDeactivationTimer) associated with the SCell, and that is applied in a slot which is the earliest after the first slot in the subframe (i+k).

The operation 3 is an operation that is related to CSI reporting of a serving cell not active in a slot which is the earliest after the first slot in the subframe (i+k), and that is applied in the slot which is the earliest after the first slot in the subframe (i+k) and in which the serving cell is activated.

As the "corresponding operation" applied in a case that the SCell is activated in response to the activation command for the SCell, the user terminal may apply any operation of transmitting the SRS in the SCell, the CSI reporting to the SCell, monitoring the PDCCH in the SCell, monitoring the PDCCH for the SCell, and transmitting the PUCCH in the SCell.

In a case that the user terminal receives a deactivation command for an SCell (for example, a MAC CE indicating deactivation of the SCell) in the slot n in the subframe i, or in a case that an SCell deactivation timer (sCellDeactivationTimer) associated with the SCell expires, a corresponding operation, except for the operation related to CSI reporting of an active serving cell applied in the slot which is the earliest after the first slot in the subframe (i+k), may be applied not later than the defined minimum requirement.

As the "corresponding operation" applied in the case that the SCell is deactivated in response to the deactivation command for the SCell, the user terminal may apply any operation of not transmitting the SRS in the SCell, not transmitting the CSI for the SCell, not transmitting a UL-SCH (UL data, UL transport channel) in the SCell, not transmitting the RACH in the SCell, not monitoring the PDCCH in the SCell, not monitoring the PDCCH for the SCell, and not transmitting the PUCCH in the SCell.

Figure 3:
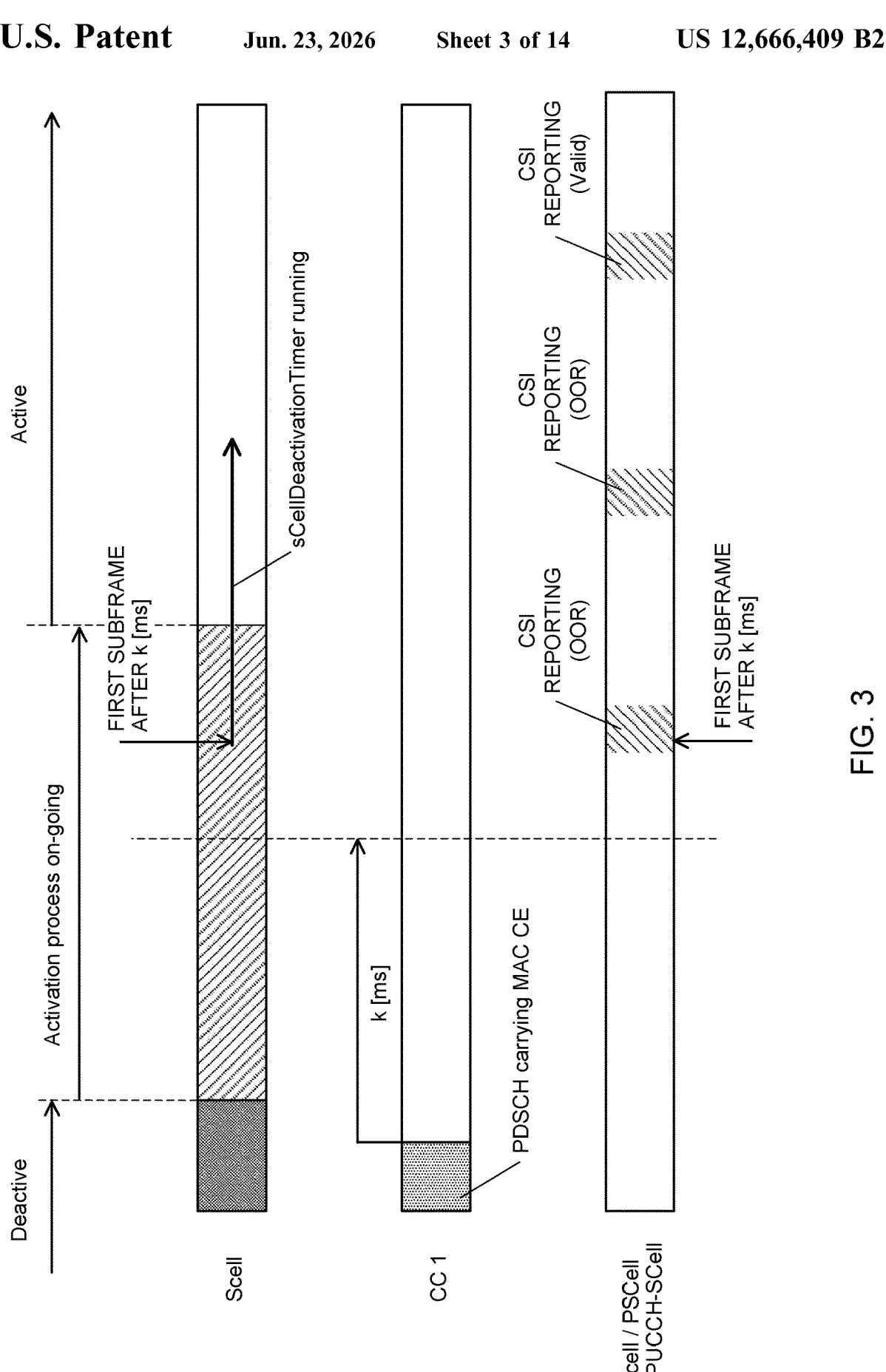
FIG. 3 is a diagram to show an example of an SCell activation/deactivation timing corresponding to Aspect 1-2 in a plurality of carriers that are configured with carrier aggregation and are different in subcarrier spacing.

FIG. 3 is a diagram to show an example of an SCell activation/deactivation timing corresponding to Aspect 1-2 in a plurality of carriers that are configured with carrier aggregation and are different in subcarrier spacing in a future radio communication system (for example, NR).

As shown in FIG. 3, a PDSCH carrying the MAC CE including the activation command for the SCell is carried in a certain slot in the subframe i in the CC 1, and the user terminal receives the PDSCH.

The user terminal starts the operation related to the SCell deactivation timer (sCellDeactivationTimer) in the certain slot in the subframe (i+k) after k [ms] from when receiving the activation command for the SCell. The slot may be a slot which is the earliest after the first slot in the subframe (i+k) based on a subcarrier spacing of the SCell to be activated.

The user terminal starts the CSI reporting in the certain slot in the subframe (i+k) after k [ms] from when receiving the activation command for the SCell. The slot may be the first slot in subframe (i+k) or the slot which is the earliest after the first slot based on a subcarrier spacing of a cell carrying the CSI reporting, for example, the PCell, the PSCell, or the PUCCH-SCell.

A timing when the user terminal starts the operation related to the SCell deactivation timer (sCellDeactivation-Timer) and a timing when the user terminal starts the CSI reporting may be the same timing in the subframe (i+k).

According to the first aspect, since the activation/deactivation timing of the SCell can be processed in the requirement at the millisecond (ms) level independent of the subcarrier spacing of the carrier, even in the case that whichever subcarrier spacing is configured on any carrier, the activation/deactivation timing of the SCell can be clearly defined.

(Second Aspect)

A second aspect describes an aspect in which the activation/deactivation timing of the SCell is processed in a requirement depending on a subcarrier spacing of any carrier.

(Aspect 2-1)

Even in a case that whichever subcarrier spacing is configured on any carrier, for example, the operations related to the CSI reporting and the SCell deactivation timer (sCellDeactivationTimer) may be started at a timing corresponding to a slot based on a subcarrier spacing of a carrier on which a PDSCH carrying an activation command for an SCell is received.

In a case that the user terminal receives an activation command for an SCell (for example, a MAC CE indicating activation of the SCell) in a slot n in a carrier on which a PDSCH carrying the activation command is received, a corresponding operation except for an operation 1 to an operation 3 described below may be applied not later than the defined minimum requirement and not earlier than at a timing corresponding to a slot (n+k) in the carrier on which the PDSCH carrying the MAC CE including the activation command for the SCell is received.

The operation 1 is an operation related to CSI reporting of an active serving cell at the timing corresponding to the slot (n+k) in the carrier on which the PDSCH carrying the activation command for the SCell is received.

The operation 2 is an operation that is related to an SCell deactivation timer (sCellDeactivationTimer) associated with the SCell, and that is applied at the timing corresponding to the slot (n+k) in the carrier on which the PDSCH carrying the activation command for the SCell is received.

The operation 3 is an operation that is related to CSI reporting of a serving cell not active at the timing corresponding to the slot (n+k) in the carrier on which the PDSCH carrying the activation command for the SCell is received, and that is applied in a slot which is the earliest after the timing corresponding to the slot (n+k) in the carrier on which the PDSCH carrying the activation command for the SCell is received and in which the serving cell is activated.

As the "corresponding operation" applied in a case that the SCell is activated in response to the activation command for the SCell, the user terminal may apply any operation of transmitting the SRS in the SCell, the CSI reporting to the SCell, monitoring the PDCCH in the SCell, monitoring the PDCCH for the SCell, and transmitting the PUCCH in the SCell.

In a case that the user terminal receives a deactivation command for an SCell (for example, a MAC CE indicating deactivation of the SCell) at a timing corresponding to the slot n in the carrier on which the PDSCH carrying the activation command for the SCell is received, or in a case that an SCell deactivation timer (sCellDeactivationTimer) associated with the SCell expires, a corresponding operation, except for the operation related to CSI reporting of an active serving cell applied at the timing corresponding to the slot (n+k) in the carrier on which the PDSCH carrying the activation command is received, may be applied not later than the defined minimum requirement.

As the "corresponding operation" applied in the case that the SCell is deactivated in response to the deactivation command for the SCell, the user terminal may apply any operation of not transmitting the SRS in the SCell, not transmitting the CSI for the SCell, not transmitting a UL-SCH (UL data, UL transport channel) in the SCell, not transmitting the RACH in the SCell, not monitoring the PDCCH in the SCell, not monitoring the PDCCH for the SCell, and not transmitting the PUCCH in the SCell.

Figure 4:
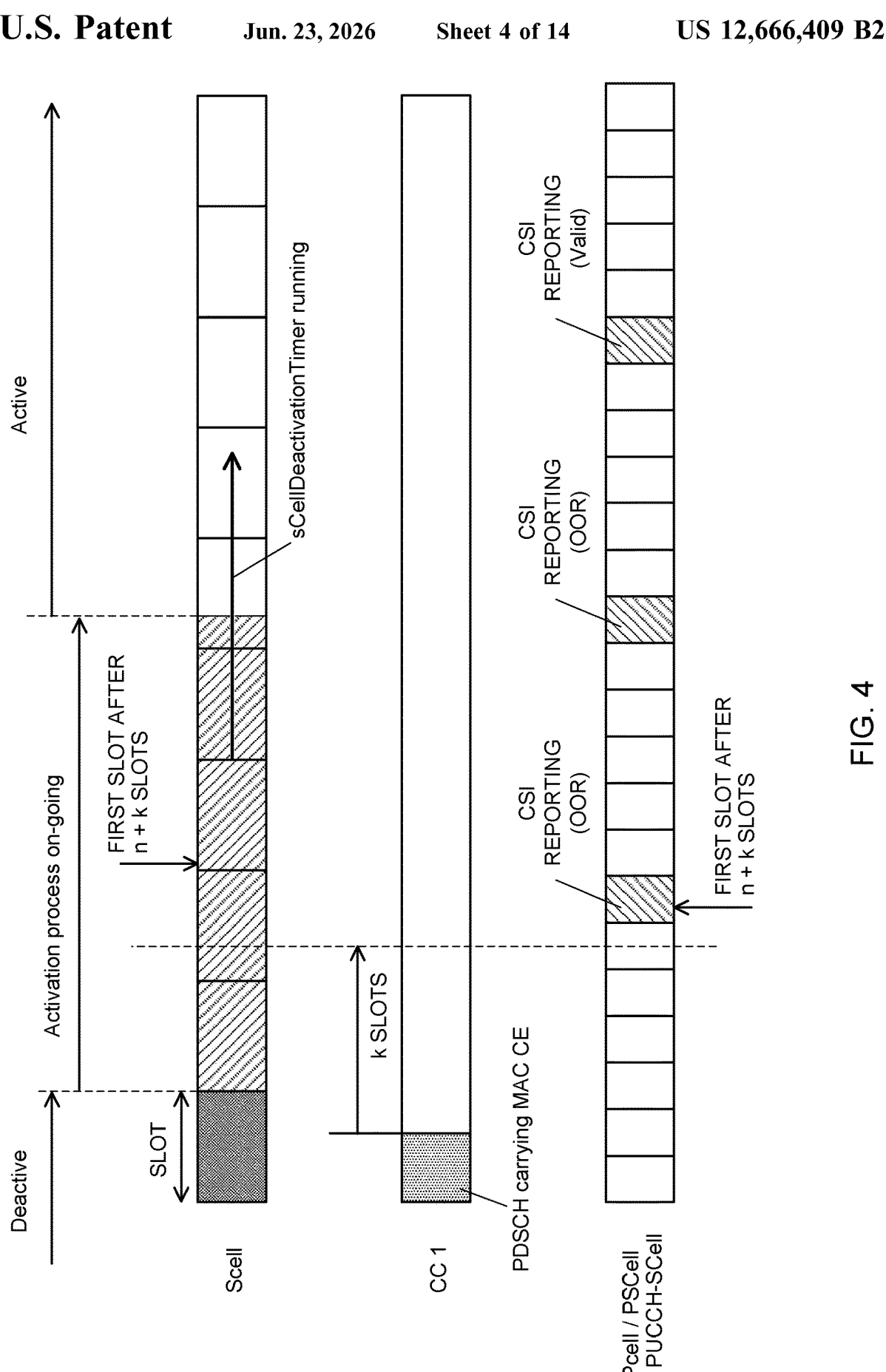
FIG. 4 is a diagram to show an example of an SCell activation/deactivation timing corresponding to Aspect 2-1 in a plurality of carriers that are configured with carrier aggregation and are different in subcarrier spacing.

FIG. 4 is a diagram to show an example of an SCell activation/deactivation timing corresponding to Aspect 2-1 in a plurality of carriers that are configured with carrier aggregation and are different in subcarrier spacing in a future radio communication system (for example, NR).

As shown in FIG. 4, a PDSCH carrying the MAC CE including the activation command for the SCell is carried in a certain slot in the CC 1, and the user terminal receives the PDSCH. The CC 1 shown in FIG. 4 corresponds to the carrier on which the PDSCH carrying the activation command for the SCell is received. The user terminal receives an activation command in a slot n in the CC 1.

The user terminal starts the operation related to the SCell deactivation timer (sCellDeactivationTimer) in a slot (n+k) in the CC 1 that is the carrier on which the PDSCH carrying the activation command for the SCell is received.

The user terminal starts the CSI reporting in a slot, in the PCell/PSCell/PUCCH-SCell, which is the earliest after the timing corresponding to the slot (n+k) in the CC 1 that is the carrier on which the PDSCH carrying the activation command for the SCell is received.

(Aspect 2-2)

Even in a case that whichever subcarrier spacing is configured on any carrier, for example, the operations related to the CSI reporting and the SCell deactivation timer (sCellDeactivationTimer) may be started at a timing corresponding to a slot based on a subcarrier spacing of an SCell to be activated by an activation command for the SCell.

In a case that the user terminal receives an activation command for an SCell (for example, a MAC CE indicating activation of the SCell) in a slot n of the SCell to be activated by the activation command, a corresponding operation except for an operation 1 to an operation 3 described below may be applied not later than the defined minimum requirement and not earlier than at a timing corresponding to a slot (n+k) of the SCell to be activated by the activation command for the SCell.

The operation 1 is an operation related to CSI reporting of an active serving cell at the timing corresponding to the slot (n+k) of the SCell to be activated by the activation command for the SCell.

The operation 2 is an operation that is related to an SCell deactivation timer (sCellDeactivationTimer) associated with the SCell, and that is applied at the timing corresponding to the slot (n+k) of the SCell to be activated by the activation command for the SCell.

The operation 3 is an operation that is related to CSI reporting of a serving cell not active at the timing corresponding to the slot (n+k) of the SCell to be activated by the activation command for the SCell, and that is applied in a slot which is the earliest after the timing corresponding to the slot (n+k) of the SCell to be activated by the activation command for the SCell and in which the serving cell is activated.

As the "corresponding operation" applied in a case that the SCell is activated in response to the activation command for the SCell, the user terminal may apply any operation of transmitting the SRS in the SCell, the CSI reporting to the SCell, monitoring the PDCCH in the SCell, monitoring the PDCCH for the SCell, and transmitting the PUCCH in the SCell.

In a case that the user terminal receives a deactivation command for an SCell (for example, a MAC CE indicating deactivation of the SCell) at a timing corresponding to the slot n of the SCell to be activated by the activation command for the SCell, or in a case that an SCell deactivation timer (sCellDeactivationTimer) associated with the SCell expires, a corresponding operation, except for the operation related to CSI reporting of an active serving cell applied at the timing corresponding to the slot (n+k) of the SCell to be activated by the activation command for the SCell, may be applied not later than the defined minimum requirement.

As the "corresponding operation" applied in the case that the SCell is deactivated in response to the deactivation command for the SCell, the user terminal may apply any operation of not transmitting the SRS in the SCell, not transmitting the CSI for the SCell, not transmitting a UL-SCH (UL data, UL transport channel) in the SCell, not transmitting the RACH in the SCell, not monitoring the PDCCH in the SCell, not monitoring the PDCCH for the SCell, and not transmitting the PUCCH in the SCell.

Figure 5:
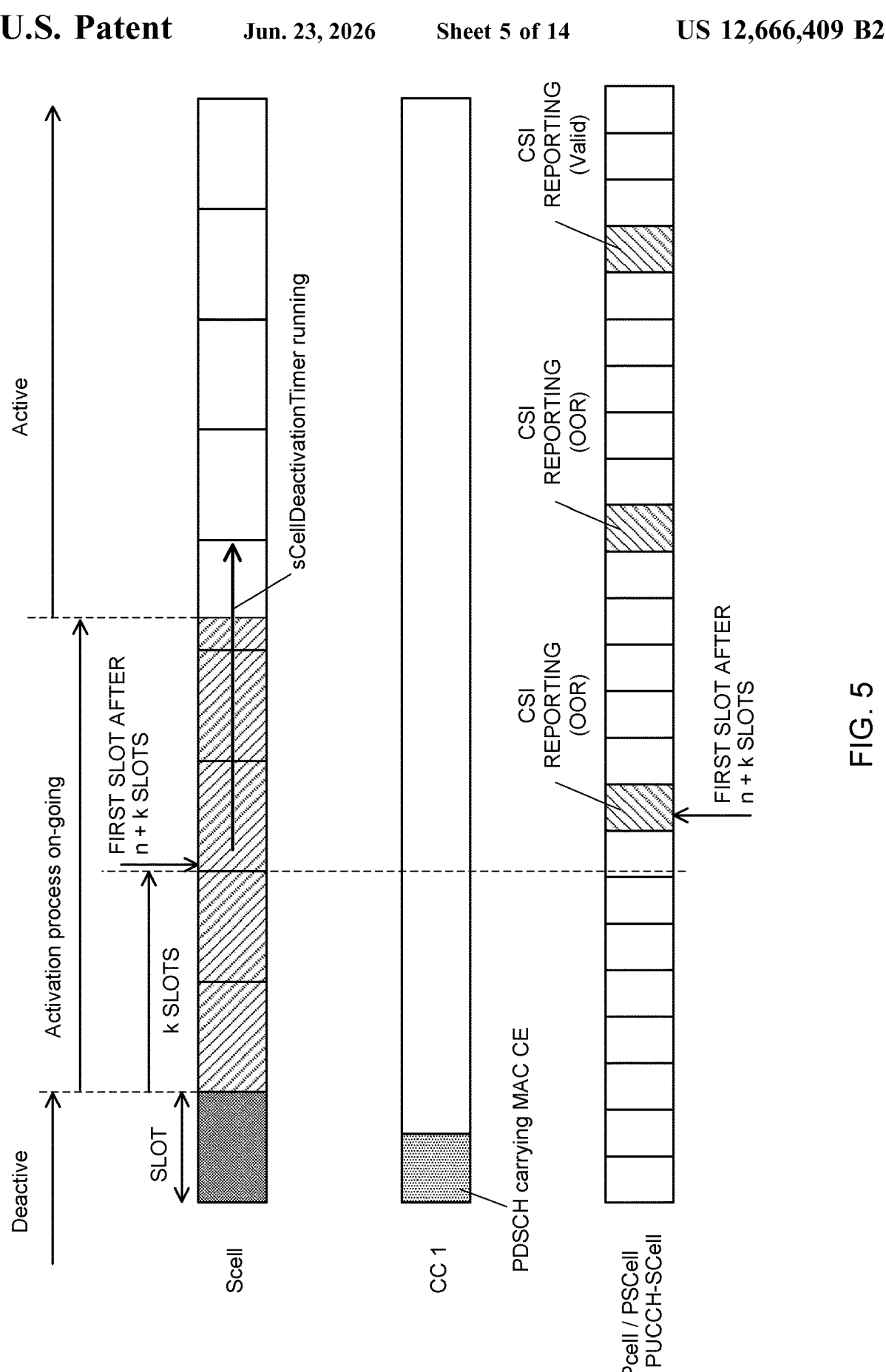
FIG. 5 is a diagram to show an example of an SCell activation/deactivation timing corresponding to Aspect 2-2 in a plurality of carriers that are configured with carrier aggregation and are different in subcarrier spacing.

FIG. 5 is a diagram to show an example of an SCell activation/deactivation timing corresponding to Aspect 2-2 in a plurality of carriers that are configured with carrier aggregation and are different in subcarrier spacing in a future radio communication system (for example, NR).

As shown in FIG. 5, a PDSCH carrying the MAC CE including the activation command for the SCell is carried in a certain slot in the CC 1, and the user terminal receives the PDSCH. The SCell shown in FIG. 5 corresponds to the SCell to be activated by the activation command for the SCell. The user terminal receives an activation command in a slot n in the SCell.

The user terminal starts the operation related to the SCell deactivation timer (sCellDeactivationTimer) in a slot (n+k) of the SCell to be activated by the activation command for the SCell.

The user terminal starts the CSI reporting in a slot, in the PCell/PSCell/PUCCH-SCell, which is the earliest after the timing corresponding to the slot (n+k) of the SCell to be activated by the activation command for the SCell.
(Aspect 2-3)

Even in a case that whichever subcarrier spacing is configured on any carrier, for example, the operations related to the CSI reporting and the SCell deactivation timer (sCellDeactivationTimer) may be started at a timing corresponding to a slot based on a subcarrier spacing of a carrier configured with a PUCCH of an SCell to be activated.

In a case that the user terminal receives an activation command for an SCell (for example, a MAC CE indicating activation of the SCell) in a slot n in the carrier configured with the PUCCH of the SCell to be activated, a corresponding operation except for an operation 1 to an operation 3 described below may be applied not later than the defined minimum requirement and not earlier than at a timing corresponding to a slot (n+k) in the carrier configured with the PUCCH of the SCell to be activated.

The operation 1 is an operation related to CSI reporting of an active serving cell at the timing corresponding to the slot (n+k) in the carrier configured with the PUCCH of the SCell to be activated.

The operation 2 is an operation that is related to an SCell deactivation timer (sCellDeactivationTimer) associated with the SCell, and that is applied at the timing corresponding to the slot (n+k) in the carrier configured with the PUSCH of the SCell to be activated.

The operation 3 is an operation that is related to CSI reporting of a serving cell not active at the timing corresponding to the slot (n+k) in the carrier configured with the PUCCH of the SCell to be activated, and that is applied in a slot which is the earliest after the timing corresponding to the slot (n+k) in the carrier configured with the PUCCH of the SCell to be activated.

As the "corresponding operation" applied in a case that the SCell is activated in response to the activation command for the SCell, the user terminal may apply any operation of transmitting the SRS in the SCell, the CSI reporting to the SCell, monitoring the PDCCH in the SCell, monitoring the PDCCH for the SCell, and transmitting the PUCCH in the SCell.

In a case that the user terminal receives a deactivation command for an SCell (for example, a MAC CE indicating deactivation of the SCell) at a timing corresponding to the slot n in the carrier configured with the PUCCH of the SCell to be activated, or in a case that an SCell deactivation timer (sCellDeactivationTimer) associated with the SCell expires, a corresponding operation, except for the operation related to CSI reporting of an active serving cell applied at the timing corresponding to the slot (n+k) in the carrier configured with the PUCCH of the SCell to be activated, may be applied not later than the defined minimum requirement.

As the "corresponding operation" applied in the case that the SCell is deactivated in response to the deactivation command for the SCell, the user terminal may apply any operation of not transmitting the SRS in the SCell, not transmitting the CSI for the SCell, not transmitting a UL-SCH (UL data, UL transport channel) in the SCell, not transmitting the RACH in the SCell, not monitoring the PDCCH in the SCell, not monitoring the PDCCH for the SCell, and not transmitting the PUCCH in the SCell.

Figure 6:
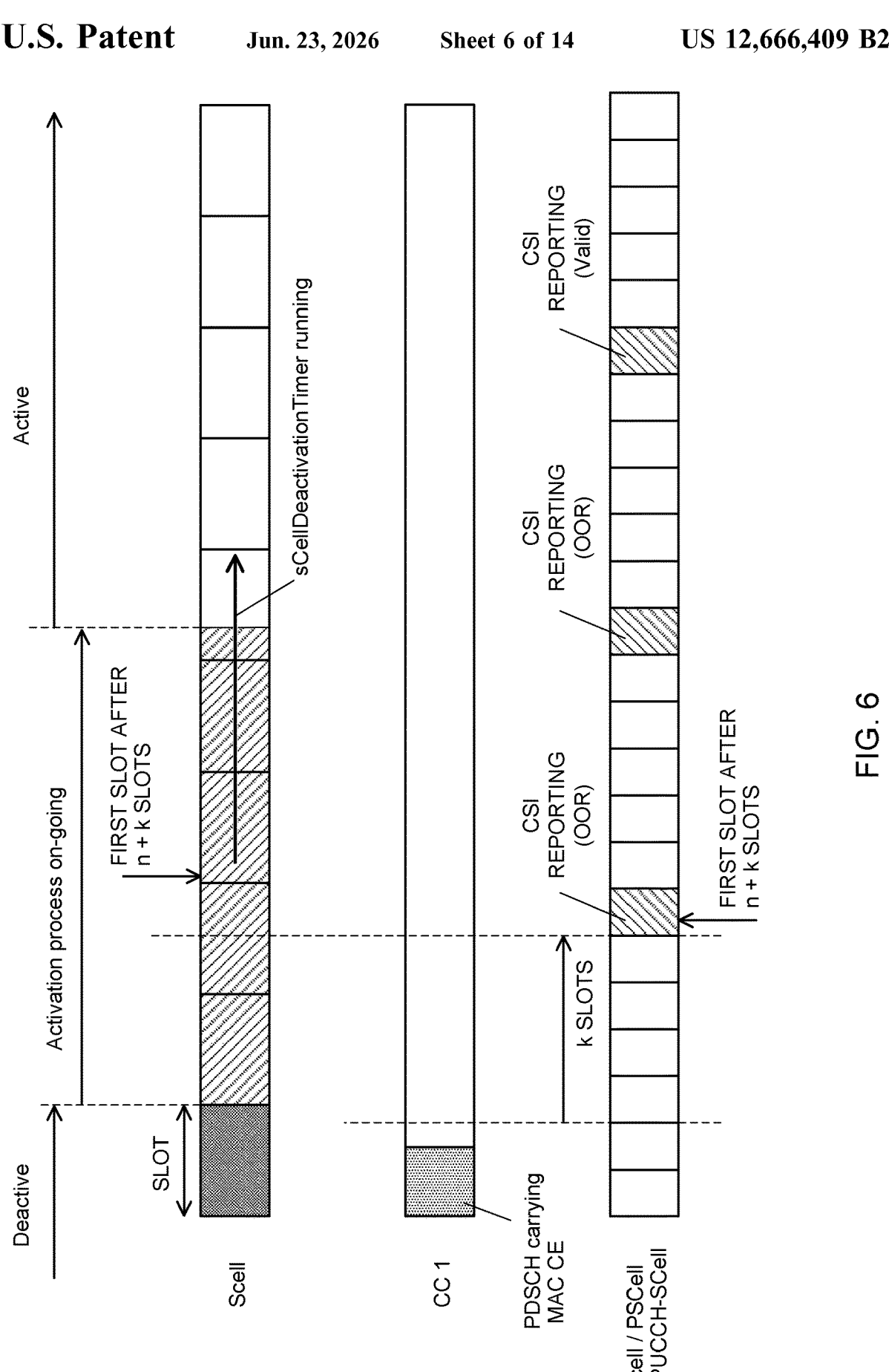
FIG. 6 is a diagram to show an example of an SCell activation/deactivation timing corresponding to Aspect 2-3 in a plurality of carriers that are configured with carrier aggregation and are different in subcarrier spacing.

FIG. 6 is a diagram to show an example of an SCell activation/deactivation timing corresponding to Aspect 2-3 in a plurality of carriers that are configured with carrier aggregation and are different in subcarrier spacing in a future radio communication system (for example, NR).

As shown in FIG. 6, a PDSCH carrying the MAC CE including the activation command for the SCell is carried in a certain slot in the CC 1, and the user terminal receives the PDSCH. The PCell/PSCell/PUCCH-SCell shown in FIG. 6 corresponds to the carrier configured with the PUCCH of the SCell to be activated. The user terminal receives an activation command at a timing corresponding to a slot n in the PCell/PSCell/PUCCH-SCell.

The user terminal starts an operation related to an SCell deactivation timer (sCellDeactivationTimer) in a slot, in the SCell, which is the earliest after the timing corresponding to a slot (n+k) in the PCell/PSCell/PUCCH-SCell that is the carrier configured with the PUCCH of the SCell to be activated.

The user terminal starts the CSI reporting in the slot which is the earliest after the timing corresponding to the slot (n+k) in the PCell/PSCell/PUCCH-SCell that is the carrier configured with the PUCCH of the SCell to be activated.
(Aspect 2-4)

The activation/deactivation timing of the SCell may be a maximum value or minimum value of a processing delay in a combination of any of (1) a subcarrier spacing of a carrier that carries a PDSCH carrying a MAC CE including an activation command or deactivation command for the SCell, (2) a subcarrier spacing of the SCell to be activated by way of a MAC CE including an activation command or deactivation command for the SCell, and (3) a subcarrier spacing of a carrier (cell) configured with a PUCCH of the SCell to be activated.

The activation/deactivation timing of the SCell may be a maximum value or minimum value of a processing delay of, for example, (1) a subcarrier spacing of a carrier that carries a PDSCH carrying a MAC CE including an activation command or deactivation command for the SCell and (3) a subcarrier spacing of a carrier configured with a PUCCH of the SCell to be activated.

The activation/deactivation timing of the SCell may be a maximum value or minimum value of a processing delay of, for example, (1) a subcarrier spacing of a carrier that carries a PDSCH carrying a MAC CE including an activation command or deactivation command for the SCell and (2) a subcarrier spacing of the SCell to be activated by way of a MAC CE including an activation command or deactivation command for the SCell.

The activation/deactivation timing of the SCell may be a maximum value or minimum value of a processing delay of, for example, (3) a subcarrier spacing of a carrier configured with a PUCCH of the SCell to be activated and (2) a subcarrier spacing of the SCell to be activated by way of a MAC CE including an activation command or deactivation command for the SCell.

The activation/deactivation timing of the SCell may be a maximum value or minimum value of a processing delay of, for example, (1) a subcarrier spacing of a carrier that carries a PDSCH carrying a MAC CE including an activation command or deactivation command for the SCell, (2) a subcarrier spacing of the SCell to be activated by way of a MAC CE including an activation command or deactivation command for the SCell, and (3) a subcarrier spacing of a carrier (cell) configured with a PUCCH of the SCell to be activated.

The activation/deactivation timing of the SCell may be a function of any combination of (1) a subcarrier spacing of a carrier that carries a PDSCH carrying a MAC CE including an activation command or deactivation command for the SCell, (2) a subcarrier spacing of the SCell to be activated by way of a MAC CE including an activation command or deactivation command for the SCell, and (3) a subcarrier spacing of a carrier (cell) configured with a PUCCH of the SCell to be activated.

For example, a value of k for the slot (n+k) associated with the definition of the activation/deactivation timing of the SCell may be defined by Equation (1) below.

[Math. 1]

$$k = \left\lceil N_{slot}^{subframe,\mu} \cdot (N_{T,1} + N_{T,2} + \text{delta})/T_{sf} \right\rceil \qquad \text{Equation (1)}$$

Here, $N_{T,1}$ represents a time duration of $N_1$ symbols corresponding to a PDSCH reception time for a PDSCH processing capability 1 or 2 in a case that an additional PDSCH DM-RS (Demodulation Reference Signal) is configured or not configured.

Here, $N_{T,2}$ represents a time duration of $N_2$ symbols corresponding to a CSI reporting preparation time for a CSI processing capability 1 or 2.

n and $N^{subframe, \mu}_{slot}$ are determined for a minimum subcarrier spacing of a subcarrier spacing of any combination of (1) a subcarrier spacing of a carrier that carries a PDSCH carrying a MAC CE including an activation command or deactivation command for the SCell, (2) a subcarrier spacing of the SCell to be activated by way of a MAC CE including an activation command or deactivation command for the SCell, and (3) a subcarrier spacing of a carrier (cell) configured with a PUCCH of the SCell to be activated.

delta represents a correction coefficient, and can include a timing advance (TA) and some other delays.

According to the second aspect, since the activation/deactivation timing of the SCell can be processed in the requirement depending on the subcarrier spacing of any carrier, the activation/deactivation timing of the SCell can be clearly defined.

(Third Aspect)

A third aspect describes an aspect in which the activation/deactivation timing of the SCell is defined by way of downlink control information (DCI).

The SCell can be activated/deactivated by way of the DCI transmitted on another carrier (cell) having a different subcarrier spacing. The DCI indicating deactivation can be transmitted by the activated SCell itself.

The activation/deactivation timing of the SCell by way of the DCI may be the same as the activation/deactivation of the SCell by way of the MAC CE shown in the first aspect and the second aspect.

The activation/deactivation timing of the SCell by way of the DCI may be indicated by the DCI. Specifically, a value of k for the slot (n+k) associated with the definition of the activation/deactivation timing of the SCell k may be indicated by the DCI. A subcarrier spacing of k can be based on any one, a maximum value or minimum value of any combination, or a function of any combination of (1) a subcarrier spacing of an SCell to be activated/deactivated, (2) a subcarrier spacing of a carrier (cell) carrying DCI indicating activation/deactivation, and (3) a subcarrier spacing of a carrier (cell) transmitting CSI reporting like a PUCCH cell.

In a case that the value of k indicated by the DCI is not configured, an initial value of k or k configured through higher layer may be used.

A fixed timing for the activation of the SCell may be defined for the activation/deactivation timing of the SCell by way of the DCI.

In a case that the user terminal receives DCI indicating activation of an SCell in the slot n, a corresponding operation except for an operation 4 to an operation 6 described below may be applied not later than a slot (n+M) that is the minimum requirement and not earlier than in the slot (n+k).

The operation 4 is an operation related to CSI reporting of a serving cell that is active in the slot (n+k).

The operation 5 is an operation that is related to an SCell deactivation timer (sCellDeactivationTimer) associated with the SCell, and that is applied in the slot (n+k).

The operation 6 is an operation that is related to CSI reporting of a serving cell not active in the slot (n+k), and that is applied in a slot which is the earliest after the slot (n+k) and in which the serving cell is activated.

In a case that the user terminal receives DCI indicating deactivation of an SCell in the slot n, or in a case that an SCell deactivation timer (sCellDeactivationTimer) associated with the SCell expires, a corresponding operation, except for the operation related to CSI reporting of an active serving cell applied in the slot (n+k), may be applied not later than the slot (n+M) that is the minimum requirement.

Figure 7A:
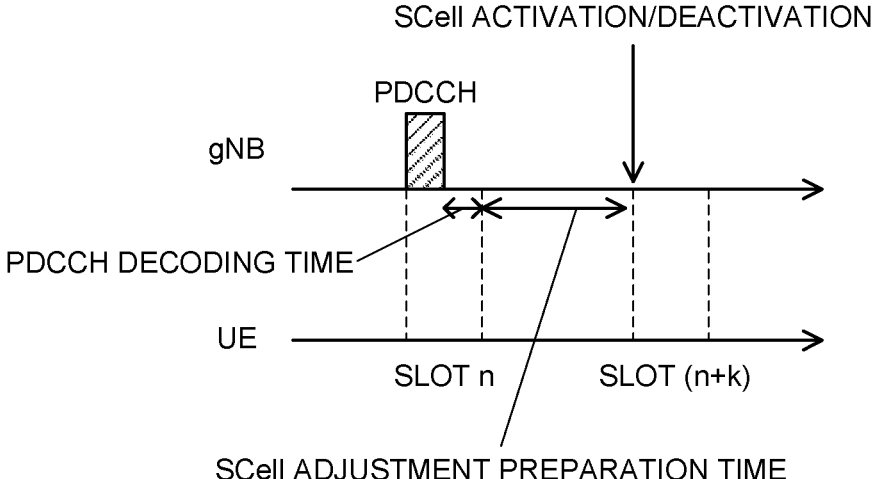
FIGS. 7A and 7B are diagrams to show examples of an activation/deactivation timing of an SCell by way of DCI.
Figure 7B:
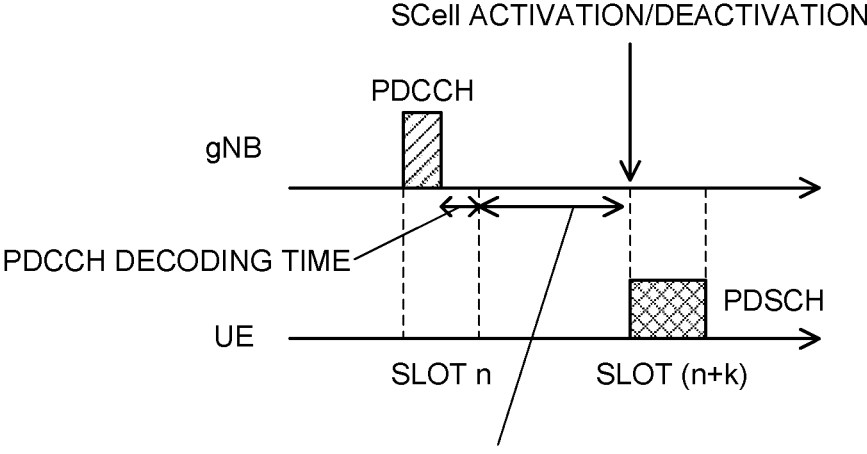

FIGS. 7A and 7B are diagrams to show examples of an activation/deactivation timing of an SCell by way of DCI.

As shown in FIG. 7A, in SCell activation without scheduling of data based on the DCI, k may satisfy a PDCCH processing time and a preparation time for adjusting the SCell.

As shown in FIG. 7B, in SCell activation with scheduling of data based on the DCI, k may satisfy a PDCCH processing time, a preparation time for adjusting the SCell, and a preparation time for PDSCH reception and PUSCH transmission.

A fixed timing for the activation of the SCell may be dynamically indicated by way of the DCI for the activation/deactivation timing of the SCell by way of the DCI.

For example, a time domain resource allocation field in the DCI (DL assignment or UL grant) indicating activation may be reused to indicate a start time of the SCell activation.

Figure 8A:
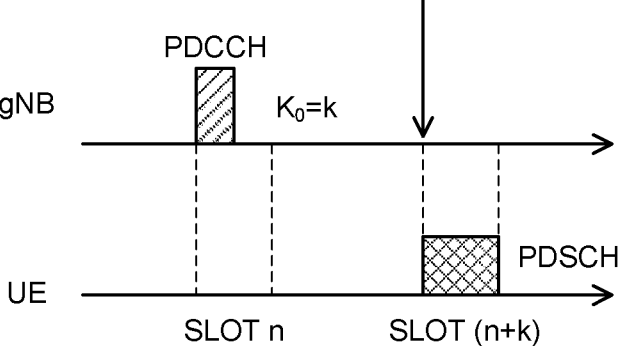
FIGS. 8A and 8B are diagrams to show examples of an activation/deactivation timing of an SCell by way of DCI.
Figure 8B:
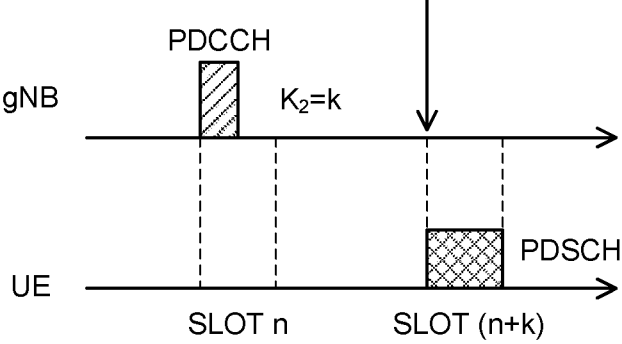

FIGS. 8A and 8B are diagrams to show examples of an activation/deactivation timing of an SCell by way of DCI.

As shown in FIG. 8A, the user terminal may determine the slot (n+k) that is a start timing of the SCell activation, based on a slot offset Ko (=k) indicated by the time domain resource allocation field (a start and length indicator value (SLIV)) in the DL assignment in the slot n indicating the SCell activation.

As shown in FIG. 8B, the user terminal may determine the slot (n+k) that is the start timing of the SCell activation, based on a slot offset $K_2$ (=k) indicated by the time domain resource allocation field (SLIV) in the UL grant in the slot n indicating the SCell activation.

According to the third aspect, the user terminal and the base station can clearly define the activation/deactivation timing of the SCell by way of the DCI.

(Radio Communication System)

Hereinafter, a structure of a radio communication system according to the present embodiment will be described. In this radio communication system, a radio communication method according to the embodiment described above is adopted.

Figure 9:
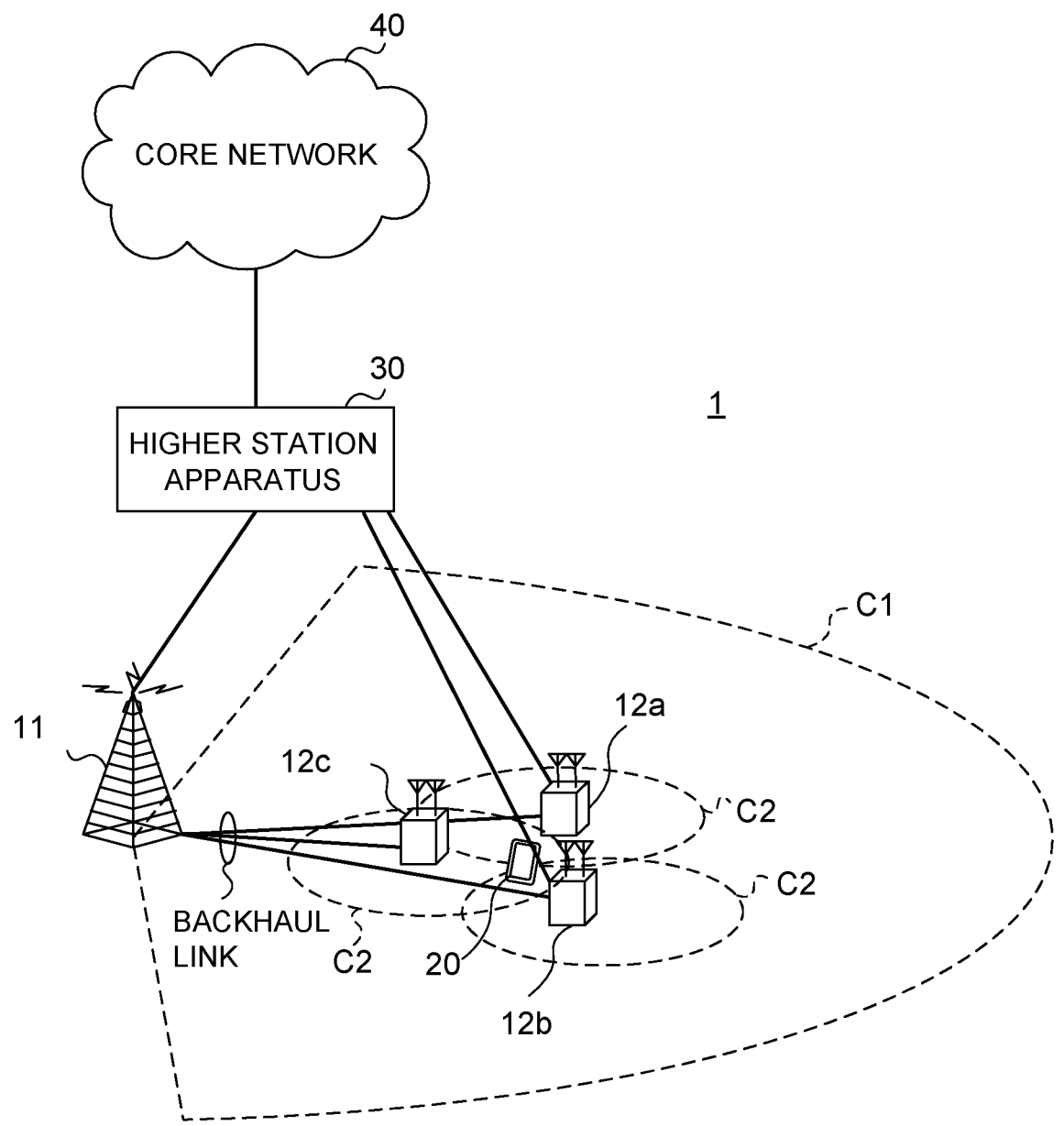
FIG. 9 is a diagram to show an example of a schematic structure of a radio communication system according to the present embodiment.

FIG. 9 is a diagram to show an example of a schematic structure of the radio communication system according to the present embodiment. A radio communication system 1 can adopt carrier aggregation (CA) or dual connectivity (DC) to group a plurality of fundamental frequency blocks (component carriers) into one, where the system bandwidth in an LTE system (for example, 20 MHz) constitutes one unit. The radio communication system 1 may be referred to as SUPER 3G, LTE-A (LTE-Advanced), IMT-Advanced, 4G, 5G, FRA (Future Radio Access), NR (New Radio), and the like.

The radio communication system 1 includes a base station 11 that forms a macro cell C1, and base stations 12a to 12c that form small cells C2, which are placed within the macro cell C1 and which are narrower than the macro cell C1. User terminals 20 are placed in the macro cell C1 and in each small cell C2. Numerologies different from each other between the cells may be adopted. The numerologies refer to a set of communication parameters characterizing a signal design in a RAT and a RAT design.

The user terminal 20 can connect with both the base station 11 and the base stations 12. The user terminal 20 may use the macro cell C1 and the small cells C2 at the same time by means of the carrier aggregation (CA) or the dual connectivity (DC), the macro cell C1 and the small cells C2 using frequencies different from each other. The user terminal 20 may adopt the carrier aggregation (CA) or the dual connectivity (DC) by using a plurality of cells (CCs) (for example, two or more CCs). The user terminal can use a licensed band CC and an unlicensed band CC as the plurality of cells. A TDD carrier adopting a shortened TTI may be configured to be included in any one of a plurality of cells.

Between the user terminals 20 and the base station 11, communication can be carried out using a carrier of a relatively low frequency band (for example, 2 GHz) and a narrow bandwidth (also referred to as an "existing carrier," a "Legacy carrier," and so on). Between the user terminals 20 and the base stations 12, a carrier of a relatively high frequency band (for example, 3.5 GHz, 5 GHz, 30 to 70 GHz, and so on) and a wide bandwidth may be used, or the same carrier as that used between the user terminals 20 and the base station 11 may be used. Note that the structure of the frequency band for use in each base station is by no means limited to these.

A wired connection (for example, an optical fiber in compliance with the CPRI (Common Public Radio Interface), an X2 interface, and so on) or a wireless connection may be established between the base station 11 and the base stations 12 (or between two base stations 12).

The base station 11 and the base stations 12 are each connected with a higher station apparatus 30, and are connected with a core network 40 via the higher station apparatus 30. The higher station apparatus 30 may be, for example, an access gateway apparatus, a radio network controller (RNC), a mobility management entity (MME), and so on, but is by no means limited to these. Each base station 12 may be connected with the higher station apparatus 30 via the base station 11.

The base station 11 is a base station having a relatively wide coverage, and may be referred to as a macro base station, a central node, an eNB (eNodeB), a transmission/reception point, and so on. The base stations 12 are base stations having local coverages, and may be referred to as small base stations, micro base stations, pico base stations, femto base stations, HeNBs (home eNodeBs), RRHs (Remote Radio Heads), transmission reception points, and so on. Hereinafter, the base stations 11 and 12 will be collectively referred to as "base stations 10," unless specified otherwise.

Each of the user terminals 20 is a terminal that supports various communication schemes such as LTE and LTE-A, and may include not only mobile communication terminals but also stationary communication terminals.

In the radio communication system 1, as radio access schemes, an OFDMA (orthogonal frequency division multiple access) can be applied to the downlink (DL), and an SC-FDMA (single-carrier frequency division multiple access) can be applied to the uplink (UL). OFDMA is a multi-carrier communication scheme to perform communication by dividing a frequency band into a plurality of narrow frequency bands (subcarriers) and mapping data to each subcarrier. The SC-FDMA is a single carrier communication scheme to mitigate interference between terminals by dividing the system bandwidth into bands including one or continuous resource blocks per terminal, and allowing a plurality of terminals to use mutually different bands. Note that the uplink and downlink radio access schemes are by no means limited to the combinations of these, and the OFDMA may be used for the UL.

In the radio communication system 1, a downlink data channel (also referred to as PDSCH (Physical Downlink Shared Channel), downlink shared channel, or the like) shared by the user terminals 20, a broadcast channel (PBCH (Physical Broadcast Channel)), L1/L2 control channels, and so on are used as the DL channels. User data, higher layer control information, SIBs (System Information Blocks) and so on are communicated on the PDSCH. MIBs (Master Information Blocks) are communicated on the PBCH.

The L1/L2 control channels include a downlink control channel (a PDCCH (Physical Downlink Control Channel), an EPDCCH (Enhanced Physical Downlink Control Channel)), a PCFICH (Physical Control Format Indicator Channel), a PHICH (Physical Hybrid-ARQ Indicator Channel) and so on. The downlink control information (DCI) including PDSCH and PUSCH scheduling information, and so on are communicated on the PDCCH. The number of OFDM symbols used for the PDCCH is communicated on the PCFICH. HARQ acknowledgment information (ACK/NACK) for the PUSCH is communicated on the PHICH. The EPDCCH is frequency-division multiplexed with the PDSCH (downlink shared data channel) and used to communicate the DCI and so on, like the PDCCH.

In the radio communication system 1, an uplink data channel (also referred to as PUSCH (Physical Uplink Shared Channel), uplink shared channel, or the like) shared by the user terminals 20, an uplink control channel (PUCCH (Physical Uplink Control Channel)), a random access channel (PRACH (Physical Random Access Channel)), and so on are used as the UL channels. User data and higher layer control information are communicated on the PUSCH. Uplink control information (UCI) including at least one of the acknowledgment information (ACK/NACK), radio quality information (CQI), and the like is communicated on the PUSCH or the PUCCH. Random access preambles for establishing connections with the cells are communicated on the PRACH.

<Base Station>

Figure 10:
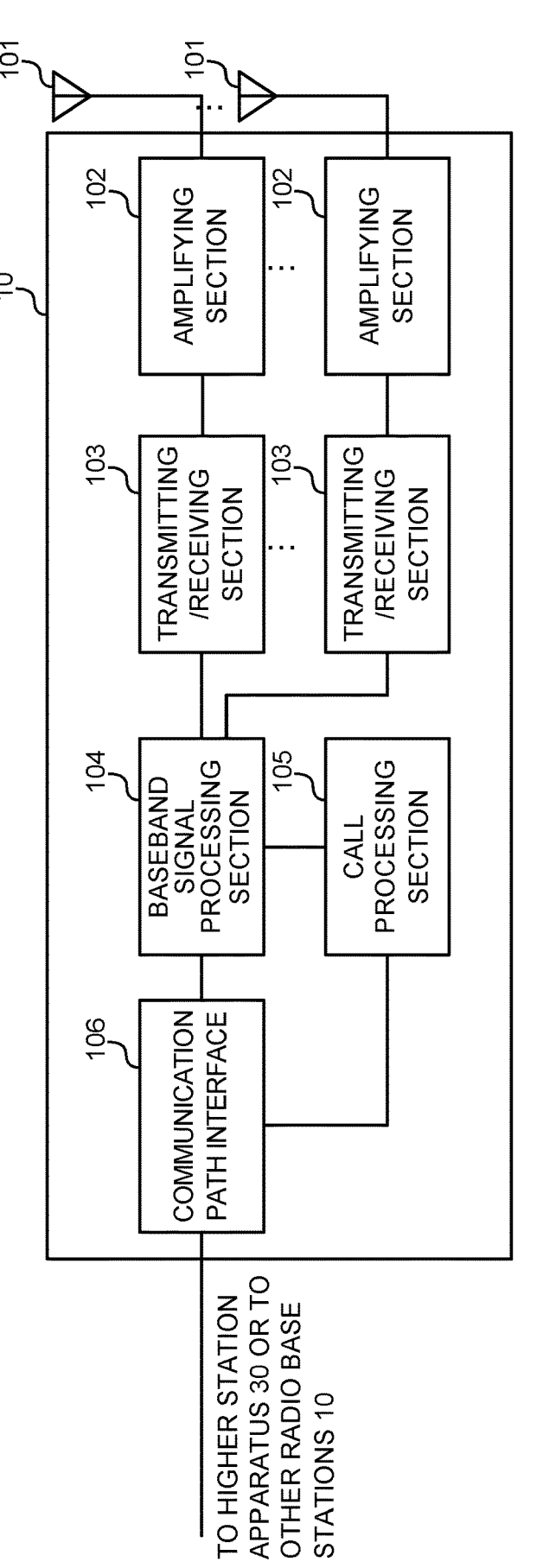
FIG. 10 is a diagram to show an example of a functional structure of a radio base station according to the present embodiment.

FIG. 10 is a diagram to show an example of an overall structure of the base station according to the present embodiment. The base station 10 includes a plurality of transmitting/receiving antennas 101, amplifying sections 102, transmitting/receiving sections 103, a baseband signal processing section 104, a call processing section 105, and a communication path interface 106. The base station 10 may be configured to include one or more transmitting/receiving antennas 101, one or more amplifying sections 102, and one or more transmitting/receiving sections 103. The base station 10 may be a transmission apparatus of downlink data or a reception apparatus of uplink data.

The downlink data to be transmitted from the base station 10 to the user terminal 20 is input from the higher station apparatus 30 to the baseband signal processing section 104, via the communication path interface 106.

In the baseband signal processing section 104, the downlink data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a precoding process, and the result is forwarded to each transmitting/receiving section 103. The downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, into radio frequency bands, and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can include transmitters/receivers, transmitting/receiving circuits or transmitting/receiving apparatus that can be described based on general understanding of the technical field to which the present invention pertains. The transmitting/receiving section 103 may be structured as a transmitting/receiving section in one entity, or may include a transmitting section and a receiving section.

As for the uplink signals, the radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signals through frequency conversion and output the baseband signals to the baseband signal processing section 104.

In the baseband signal processing section 104, the user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as configuring and releasing the communication channels, manages the state of the base station 10, and manages the radio resources.

The communication path interface 106 transmits and/or receives signals to and/or from the higher station apparatus 30 via a certain interface. The communication path interface 106 may transmit and/or receive signals (backhaul signaling) with other base stations 10 via an inter-base station interface (for example, an optical fiber in compliance with the CPRI (Common Public Radio Interface) and an X2 interface).

Each transmitting/receiving section 103 may further include an analog beamforming section performing analog beamforming. The analog beamforming section can include an analog beamforming circuit (for example, a phase shifter, a phase shift circuit), or an analog beamforming apparatus (for example, a phase shift device) that can be described based on general understanding of the technical field to which the present invention pertains. The transmitting/receiving antennas 101 can be formed of an antenna array, for example. Each transmitting/receiving section 103 is configured to adopt a single BF and a multi BF.

Each transmitting/receiving section 103 may transmit a signal using a transmission beam, or may receive a signal using a reception beam. Each transmitting/receiving section 103 may transmit and receive a signal by using a certain beam determined by the control section 301.

The transmitting/receiving sections 103 transmit downlink signals (for example, downlink control signals (downlink control channels), downlink data signals (downlink data channel, downlink shared channel), downlink reference signals (DM-RS, CSI-RS, and so on), discovery signals, synchronization signals, broadcast signals, and so on). The transmitting/receiving sections 103 receive uplink signals (for example, uplink control signals (uplink control channel), uplink data signals (uplink data channel, uplink shared channel), uplink reference signals, and so on).

The transmitting/receiving sections 103 may transmit an activation command or deactivation command for a certain cell (for example, SCell) to the user terminals 20.

A transmitting section and a receiving section according to the present invention include both or any one of the transmitting/receiving section 103 and the communication path interface 106.

Figure 11:
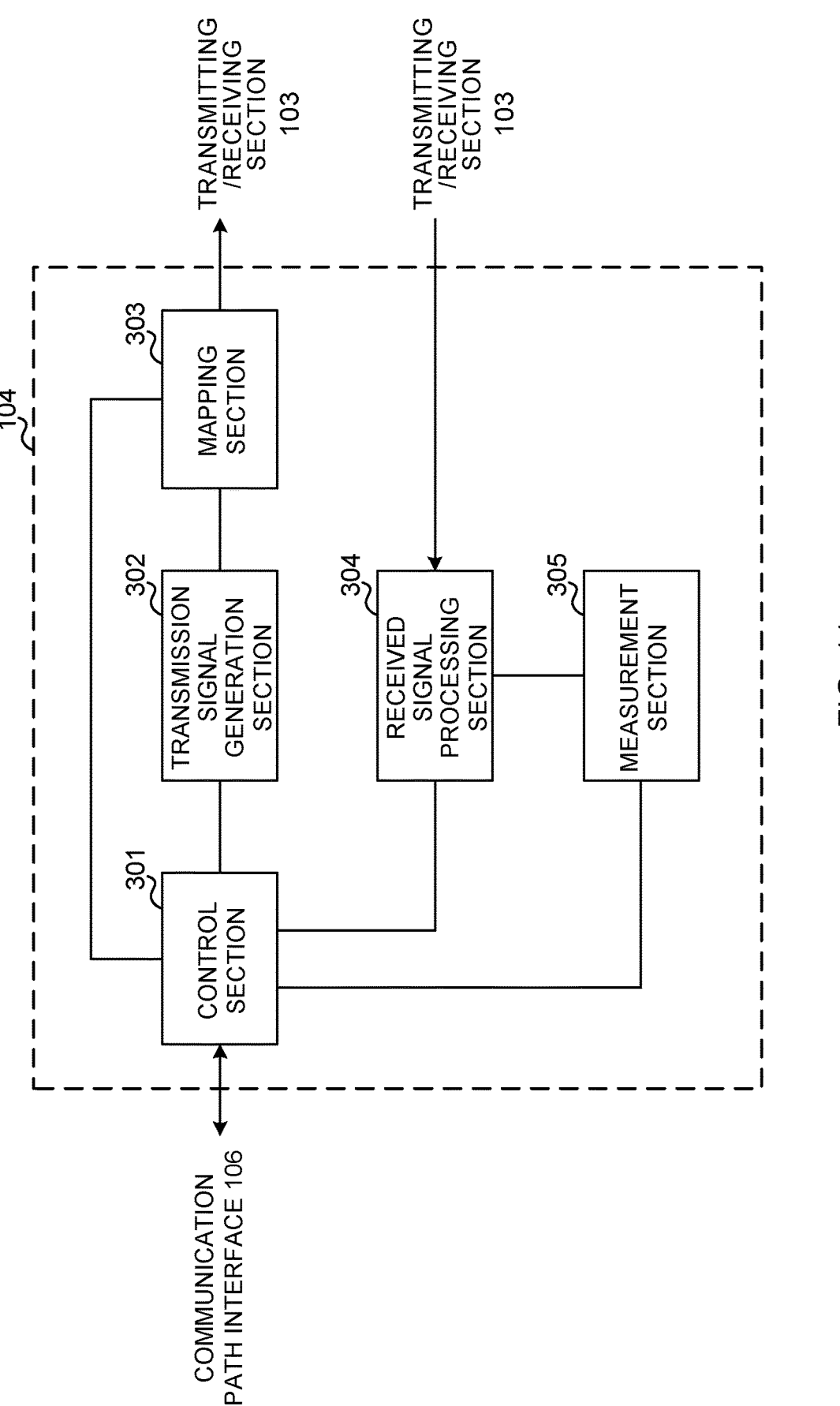
FIG. 11 is a diagram to show an example of a functional structure of a baseband signal processing section in the radio base station.

FIG. 11 is a diagram to show an example of a functional structure of the base station according to the present embodiment. This figure primarily shows functional blocks that pertain to characteristic parts of the present embodiment, and the base station 10 may also include other functional blocks that are necessary for radio communication as well. The baseband signal processing section 104 at least includes a control section 301, a transmission signal generation section 302, a mapping section 303, a received signal processing section 304, and a measurement section 305.

The control section 301 controls the whole of the base station 10. The control section 301 can include a controller, a control circuit or a control apparatus that can be described based on general understanding of the technical field to which the present invention pertains.

The control section 301, for example, controls the generation of signals by the transmission signal generation section 302, the mapping of signals by the mapping section 303, and so on. The control section 301 controls the signal receiving processes by the received signal processing section 304, the measurements of signals by the measurement section 305, and so on.

The control section 301 controls the scheduling of the downlink signal and the uplink signal (for example, resource allocation). Specifically, the control section 301 controls the transmission signal generation section 302, the mapping section 303, and the transmitting/receiving section 103 to generate and transmit the DCI (DL assignment, DL grant) including scheduling information of the downlink data channel and the DCI (UL grant) including scheduling information of the uplink data channel.

The control section 301 may determine activation/deactivation of a certain cell (for example, SCell).

The transmission signal generation section 302 generates downlink signals (downlink control channel, downlink data channel, downlink reference signals such as DM-RS, and so on) based on commands from the control section 301 and outputs the generated downlink signals to the mapping section 303. The transmission signal generation section 302 can include a signal generator, a signal generation circuit or a signal generation apparatus that can be described based on general understanding of the technical field to which the present invention pertains.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present invention pertains.

The received signal processing section 304 performs receiving processes (for example, demapping, demodulation, decoding and so on) of received signals that are input from the transmitting/receiving sections 103. The received signals are, for example, uplink signals that are transmitted from the user terminals 20 (uplink control channel, uplink data channel, uplink reference signals, and so on). The received signal processing section 304 can be constituted with a signal processor, a signal processing circuit or signal processing apparatus that can be described based on general understanding of the technical field to which the present invention pertains.

The received signal processing section 304 outputs the information decoded by the receiving process to the control section 301. For example, the reception processing section 304 outputs at least one of the preamble, the control information, and the UL data to the control section 301. The received signal processing section 304 outputs the received signals and the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present invention pertains.

The measurement section 305 may measure, for example, a received power of the received signal (for example, RSRP (Reference Signal Received Power)), a received quality (for example, RSRQ (Reference Signal Received Quality)), a channel state, or the like. The measurement results may be output to the control section 301.

<User Terminal>

Figure 12:
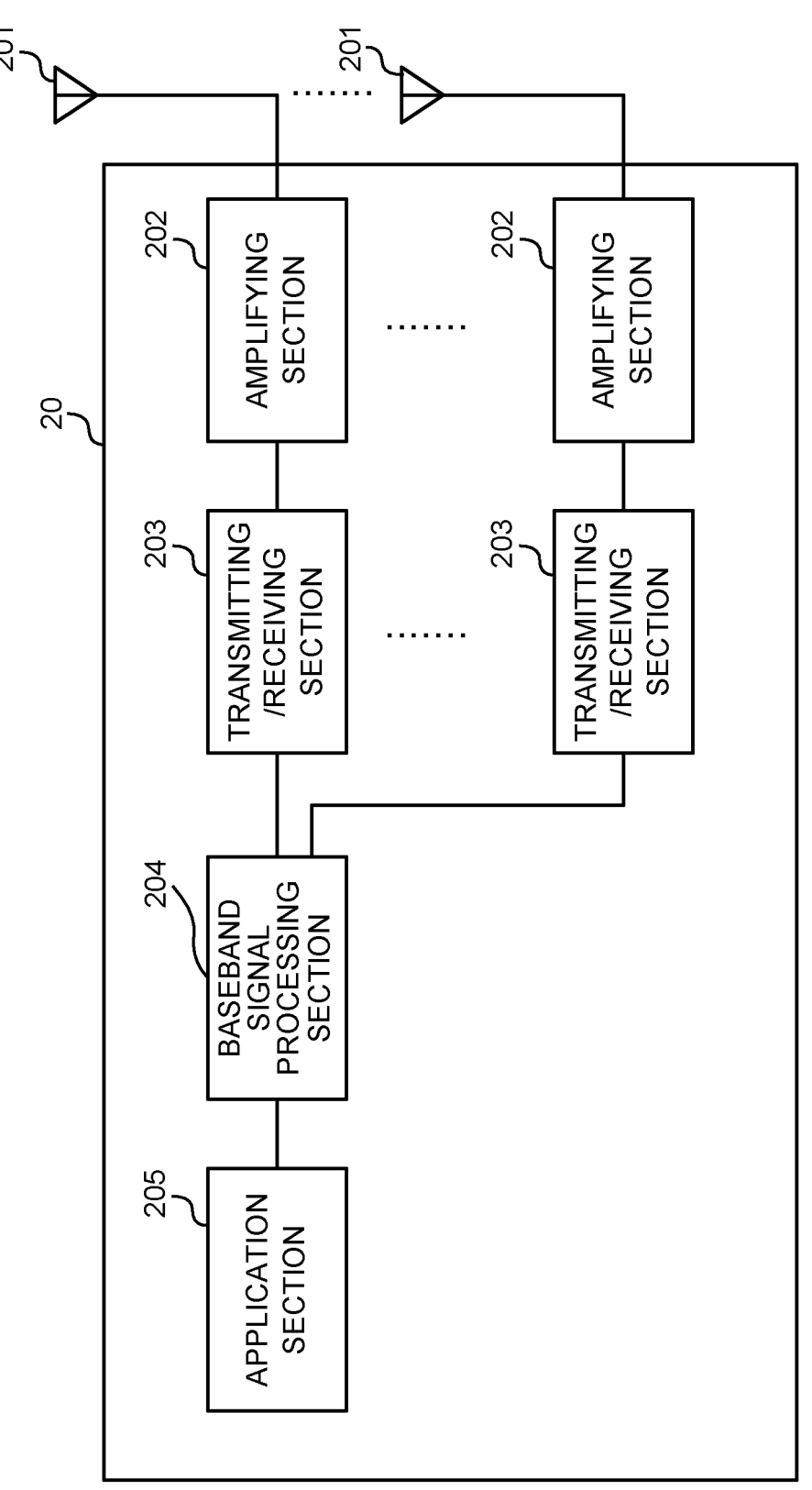
FIG. 12 is a diagram to show an example of a functional structure of a user terminal according to the present embodiment.

FIG. 12 is a diagram to show an example of an overall structure of the user terminal according to the present embodiment. A user terminal 20 includes a plurality of transmitting/receiving antennas 201, amplifying sections 202, transmitting/receiving sections 203, a baseband signal processing section 204 and an application section 205. The base station 10 may be configured to include one or more transmitting/receiving antennas 201, one or more amplifying sections 202, and one or more transmitting/receiving sections 203. The user terminal 20 may be a reception apparatus of downlink data or a transmission apparatus of uplink data.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present invention pertains. The transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink data is forwarded to the application section 205. The application section 205 performs processes related to higher layers above the physical layer and the MAC layer, and so on. The system information and the higher layer control information among the downlink data are also forwarded to the application section 205.

The uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/ receiving section 203. The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

Each transmitting/receiving section 203 may further include an analog beamforming section performing analog beamforming. The analog beamforming section can include an analog beamforming circuit (for example, a phase shifter, a phase shift circuit), or an analog beamforming apparatus (for example, a phase shift device) that can be described based on general understanding of the technical field to which the present invention pertains. The transmitting/receiving antennas 201 can be formed of an antenna array, for example. Each transmitting/receiving section 203 is configured to adopt a single BF and a multi BF.

Each transmitting/receiving section 203 may transmit a signal using a transmission beam, or may receive a signal by using a reception beam. Each transmitting/receiving section 203 may transmit and receive a signal using a certain beam determined by the control section 401.

The transmitting/receiving sections 203 receive downlink signals (for example, downlink control signals (downlink control channel), downlink data signals (downlink data channel, downlink shared channel), downlink reference signals (DM-RS, CSI-RS, and so on), discovery signals, synchronization signals, broadcast signals, and so on). The transmitting/receiving sections 203 transmit uplink signals (for example, uplink control signals (uplink control channel), uplink data signals (uplink data channel, uplink shared channel), uplink reference signals, and so on).

The transmitting/receiving sections 203 may receive an activation command or deactivation command for a certain cell (for example, SCell).

Figure 13:
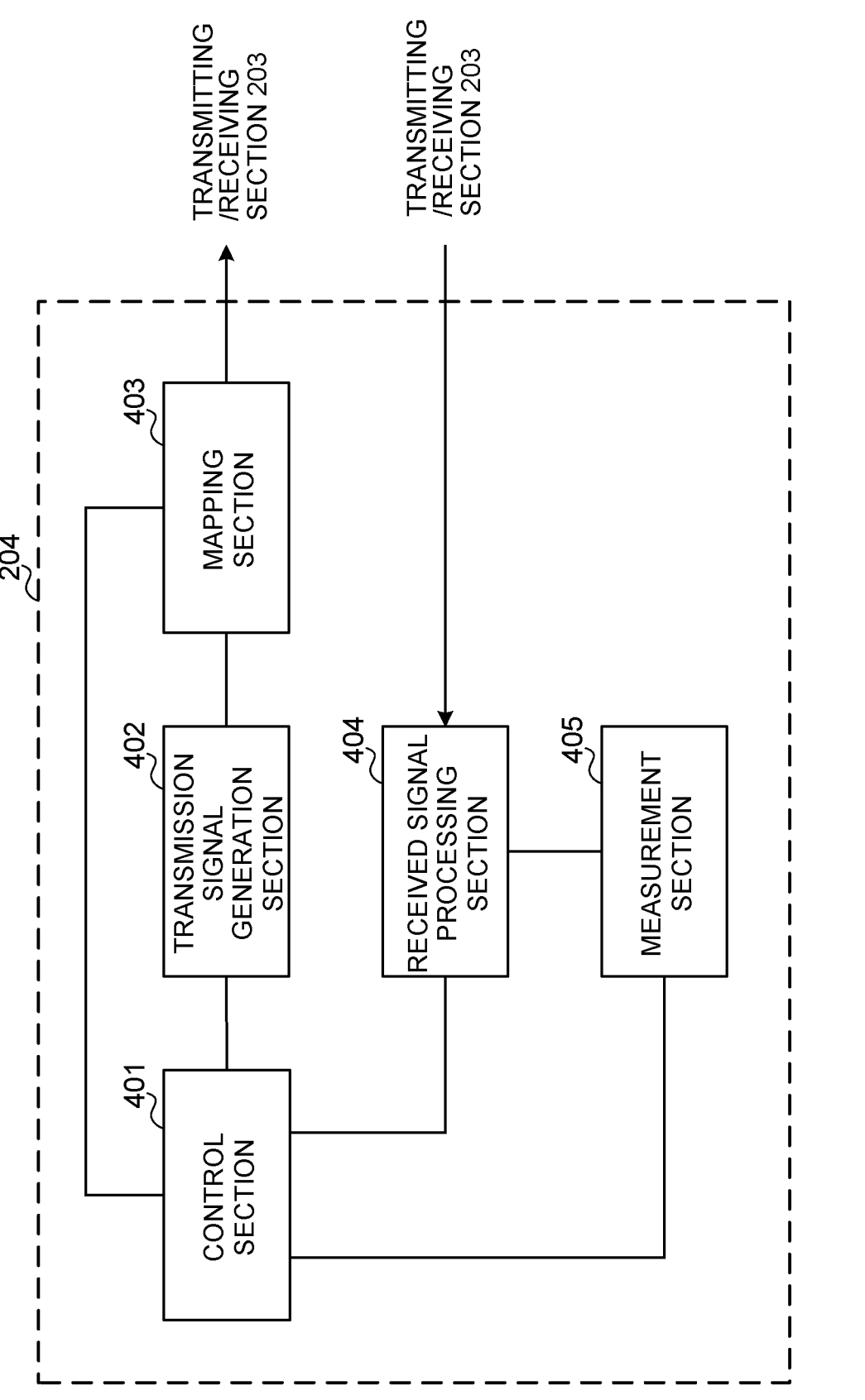
FIG. 13 is a diagram to show an example of a functional structure of a baseband signal processing section in the user terminal.

FIG. 13 is a diagram to show an example of a functional structure of the user terminal according to the present embodiment. This figure primarily shows functional blocks that pertain to characteristic parts of the present embodiment, and the user terminal 20 may also include other functional blocks that are necessary for radio communication as well. The baseband signal processing section 204 provided in the user terminal 20 at least includes a control section 401, a transmission signal generation section 402, a mapping section 403, a received signal processing section 404 and a measurement section 405.

The control section 401 controls the whole of the user terminal 20. The control section 401 can be constituted with a controller, a control circuit or control apparatus that can be described based on general understanding of the technical field to which the present invention pertains.

The control section 401, for example, controls the generation of signals by the transmission signal generation section 402, the mapping of signals by the mapping section 403, and so on. The control section 401 controls the signal receiving processes by the received signal processing section 404, the measurements of signals by the measurement section 405, and so on.

The control section 401 may apply, at a timing independent of a subcarrier spacing of a carrier on which an activation command or deactivation command for a certain cell (for example, SCell) is transmitted, an operation corresponding to reception of the activation command or the deactivation.

The timing may be after k [ms] from when the activation command or deactivation command for the certain cell (for example, SCell) is received. The timing may be the first slot based on a subcarrier spacing of the certain cell (for example, SCell) that is after k [ms] from when the activation command or deactivation command for the certain cell (for example, SCell) is received. The timing may be the first slot in the first subframe that is after k [ms] from when the activation command or deactivation command for the certain cell (for example, SCell) is received.

The timing may depend on the subcarrier spacing of the certain cell (for example, SCell). The timing may depend on a subcarrier spacing of a carrier configured with an uplink control channel (PUCCH) of the certain cell (for example, SCell).

The transmission signal generation section 402 generates uplink signals (uplink control channel, uplink data channel, uplink reference signals and so on) based on commands from the control section 401, and outputs the generated uplink signals to the mapping section 403. The transmission signal generation section 402 can be constituted with a signal generator, a signal generation circuit or signal generation apparatus that can be described based on general understanding of the technical field to which the present invention pertains.

The transmission signal generation section 402 generates an uplink data channel, based on commands from the control section 401. For example, in a case that an UL grant is included in the downlink control channel notified from the base station 10, the transmission signal generation section 402 is instructed to generate the uplink data channel by the control section 401.

The mapping section 403 maps the uplink signals generated in the transmission signal generation section 402 to radio resources, based on commands from the control section 401, and outputs the result to the transmitting/receiving sections 203. The mapping section 403 can include a mapper, a mapping circuit or a mapping apparatus that can be described based on general understanding of the technical field to which the present invention pertains.

The received signal processing section 404 performs receiving processes (for example, demapping, demodulation, decoding and so on) of received signals that are input from the transmitting/receiving sections 203. The received signals include, for example, downlink signals (downlink control channel, downlink data channel, downlink reference signals, and so on) transmitted from the base station 10. The received signal processing section 404 can be constituted with a signal processor, a signal processing circuit or signal processing apparatus that can be described based on general understanding of the technical field to which the present invention pertains. The received signal processing section 404 can constitute the receiving section according to the present invention.

The received signal processing section 404 blind-decodes the downlink control channel scheduling the transmission and reception of the downlink data channel based on commands from the control section 401 to perform a receiving process of the downlink data channel based on the DCI. The received signal processing section 404 estimates a channel gain based on the DM-RS or the CRS, and demodulates the downlink data channel, based on the estimated channel gain.

The received signal processing section 404 outputs the information decoded in the receiving process to the control section 401. The received signal processing section 404 outputs, for example, the broadcast information, system information, RRC signaling, DCI and so on, to the control section 401. The received signal processing section 404 may output the data decoding result to the control section 401. The received signal processing section 404 outputs the received signals or the signals after the receiving processes to the measurement section 405.

The measurement section 405 conducts measurements with respect to the received signals. The measurement section 405 can be constituted with a measurer, a measurement circuit or measurement apparatus that can be described based on general understanding of the technical field to which the present invention pertains.

The measurement section 405 may measure, for example, a received power of the received signal (for example, RSRP), a DL received quality (for example, RSRQ), a channel state, or the like. The measurement results may be output to the control section 401.

(Hardware Structure)

The block diagrams that have been used to describe the above embodiments show blocks in functional units. These functional blocks (components) may be implemented in arbitrary combinations of at least one of hardware and software. The method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining software with one apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 14:
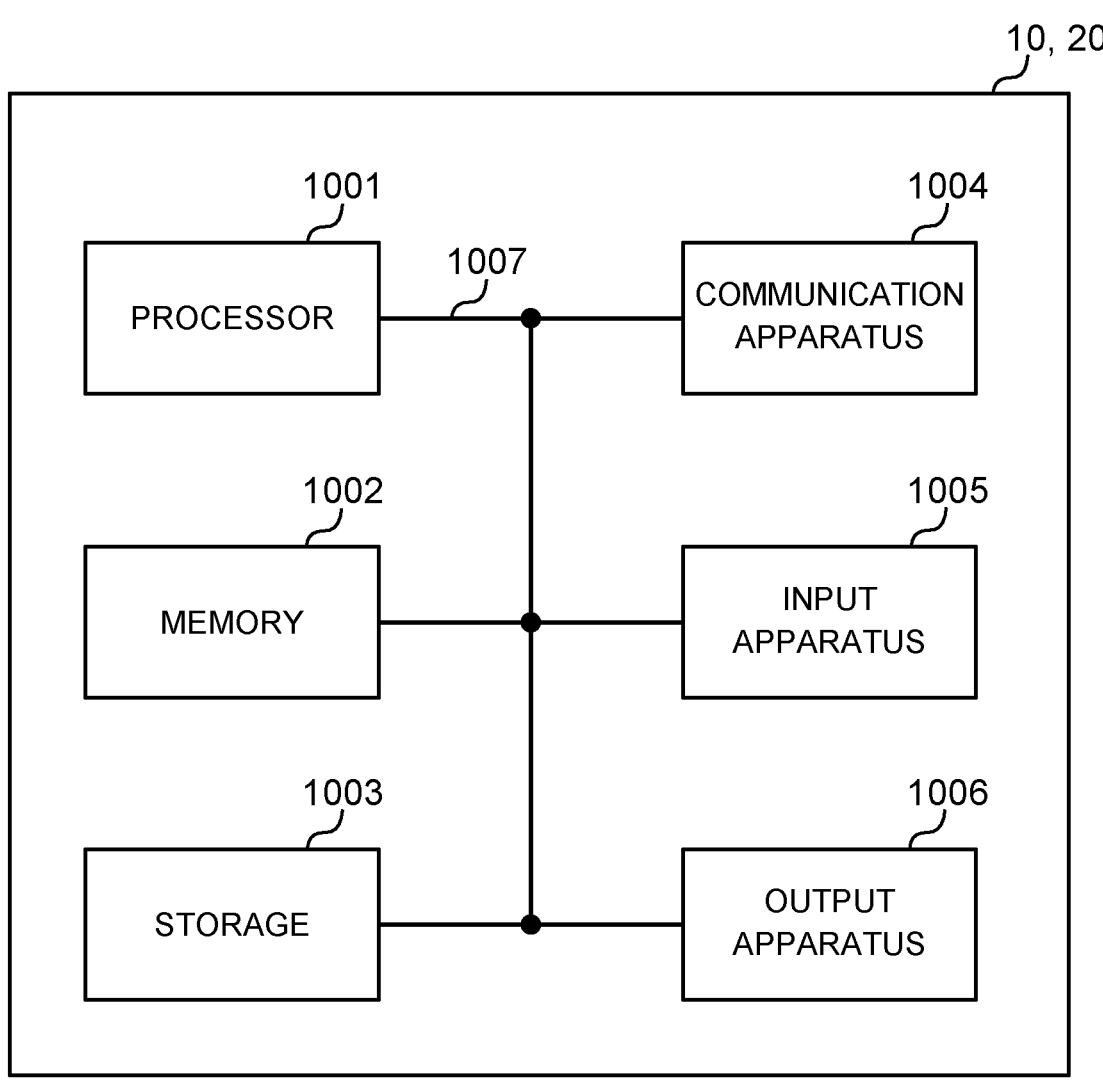
FIG. 14 is a diagram to show an example of a hardware structure of the radio base station and the user terminal according to an embodiment of the present invention.

For example, a base station, a user terminal, and so on according to one embodiment of the present disclosure may function as a computer that executes the processes of the radio communication method of the present disclosure. FIG. 14 is a diagram to show an example of a hardware structure of the base station and the user terminal according to an embodiment. Physically, the above-described base station 10 and user terminals 20 may each be formed as a computer apparatus that includes a processor 1001, a memory 1002, a storage 1003, a communication apparatus 1004, an input apparatus 1005, an output apparatus 1006, a bus 1007, and so on.

In the following description, the word "apparatus" may be interpreted as "circuit," "device," "unit," and so on. The hardware structure of the base station 10 and the user terminals 20 may be designed to include one or a plurality of apparatuses shown in the drawings, or may be designed not to include part of pieces of apparatus.

For example, although only one processor 1001 is shown, a plurality of processors may be provided. The processes may be implemented with one processor or may be implemented at the same time, in sequence, or in different manners with two or more processors. The processor 1001 may be implemented with one or more chips.

Each function of the base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

The processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 401 of each user terminal 20 may be implemented by control programs that are stored in the memory 1002 and that operate on the processor 1001, and other functional blocks may be implemented likewise.

The memory 1002 is a computer-readable recording medium, and may include, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving antennas 101 (201), amplifying sections 102 (202), transmitting/receiving sections 103 (203), communication path interface 106, and so on may be implemented by the communication apparatus 1004. The transmitting/receiving section 103 may be implemented to be physically or logically separated into a transmitting section 103*a* and a receiving section 103*b*.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). The input apparatus 1005 and the output apparatus 1006 may be provided in an integrated structure (for example, a touch panel).

These types of apparatus, including the processor 1001, the memory 1002, and others, are connected by a bus 1007 for communicating information. The bus 1007 may be formed with a single bus, or may be formed with buses that vary between pieces of apparatus.

The base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented by at least one of these pieces of hardware.

(Variations)

The terminology described in the present disclosure and the terminology that is needed to understand the present disclosure may be replaced by other terms that convey the same or similar meanings. For example, at least one of "channels" and "symbols" may be replaced by "signals" ("signaling"). Also, "signals" may be "messages." A reference signal may be abbreviated as an "RS," and may be referred to as a "pilot," a "pilot signal," and so on, depending on which standard applies. A "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may have a fixed time length (for example, 1 ms) independent of numerology.

Here, the numerology may be communication parameters applied to at least one of transmission and reception of a certain signal or channel. For example, the numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (OFDM (Orthogonal Frequency Division Multiplexing) symbols, SC-FDMA (Single Carrier Frequency Division Multiple Access) symbols, and so on). A slot may be a time unit based on the numerology.

A slot may include a plurality of mini-slots. Each mini-slot may include one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms.

For example, one subframe may be referred to as a "transmission time interval (TTI)," a plurality of consecutive subframes may be referred to as a "TTI," or one slot or one mini-slot may be referred to as a "TTI." That is, at least one of a subframe and a TTI may be a subframe (1 ms) in existing LTE, may be a period shorter than 1 ms (for example, 1 to 13 symbols), or may be a period longer than 1 ms. A unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmission power that are available for each user terminal) for the user terminal in TTI units. The definition of TTI is not limited to this.

A TTI may be a transmission time unit for channel-encoded data packets (transport blocks), code blocks, codewords, or the like or may be the unit of processing in scheduling, link adaptation, and so on. When a TTI is given, the time interval (for example, the number of symbols) to which transport blocks, code blocks, codewords, or the like are actually mapped may be shorter than the TTI.

In the case that one slot or one mini-slot is referred to as a TTI, one or more TTIs (that is, one or more slots or one or more mini-slots) may be the minimum time unit of scheduling. The number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

A long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and frequency domain, and may include one or a plurality of consecutive subcarriers in the frequency domain.

An RB may include one or a plurality of symbols in the time domain, and may be one slot, one mini-slot, one subframe, or one TTI in length. One TTI and one subframe each may be constituted of one or a plurality of resource blocks.

One or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

The above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

The information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. Since various channels (PUCCH (Physical Uplink Control Channel), PDCCH (Physical Downlink Control Channel), and so on) and information elements can be identified by any suitable names, the various names assigned to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Notification of information is by no means limited to the aspects/embodiments described in the present disclosure, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Physical layer signaling may be referred to as "L1/L2 (Layer 1/Layer 2) control information (L1/L2 control signals)," "L1 control information (L1 control signal)," and so on. RRC signaling may be referred to as an "RRC message," and can be, for example, an RRC connection setup (RRC-ConnectionSetup) message, an RRC connection reconfiguration (RRCConnectionReconfiguration) message, and so on. MAC signaling may be reported using, for example, MAC control elements (MAC CEs).

Reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Software, commands, information, and so on may be transmitted and received via communication media. For example, in a case that software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure are used interchangeably.

In the present disclosure, the terms such as "precoding," a "precoder," a "weight (precoding wait)," "Quasi-Co-Location (QCL)," a "transmit power," a "phase rotation," an "antenna port," an "antenna port group," a "layer," "the number of layers," a "rank," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNodeB (eNB)," a "gNodeB (gNB)," an "access point," a "transmission point," a "reception point," a "transmission/reception point," a "cell," a "sector," a "cell group," a "carrier," a "component carrier," a "bandwidth part (BWP)," and so on can be used interchangeably. A base station may be referred to as the terms such as a "macro cell," a "small cell," a "femto cell," a "pico cell," and so on.

A base station can accommodate one or a plurality of (for example, three) cells (also referred to as "sectors"). In a case that a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," "terminal," and the like may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "communication apparatus," and so on. At least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). At least one of a base station and a mobile station also includes an apparatus which does not necessarily move during communication operation. For example, at least one of a base station and a mobile station may be an IoT (Internet of Things) device such as a sensor.

The base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "D2D (Device-to-Device)," "V2X (Vehicle-to-Everything)," and the like). In this case, the user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and next-generation systems that are enhanced based on these, and so on. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

"Judging (determining)" may be interpreted to mean making "judgments (determinations)" about receiving (for example, receiving information), transmitting (for example, transmitting information), input, output, accessing (for example, accessing data in a memory), and so on.

"Judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

"Judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, in a case that two elements are connected, the two elements may be considered "connected" or "coupled" to each other by using one or more electrical wires, cables, printed electrical connections, and the like, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." The terms "separate," "be coupled" and so on may be interpreted similarly.

In a case that the terms "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
a receiver that receives an activation command for a secondary cell; and
a processor that applies, when the receiver receives the activation command in slot n in a cell, a first action corresponding to a reception of the activation command, at a timing later than slot n+k in the cell,
wherein a value of the k is based on a subcarrier spacing of another cell where a physical uplink control channel (PUCCH) for the secondary cell to be activated by the activation command is transmitted and indicates a number of slots each having a same subcarrier spacing as the slot n in the cell,
wherein the secondary cell is not a primary secondary cell,
wherein the first action corresponding to the reception of the activation command includes another PUCCH transmission on the secondary cell, and
wherein the processor applies, in an earliest slot after the slot n+k that is a first slot after the slot n+k and that does not overlap with the slot n+k, a second action related to CSI reporting of a serving cell which is not active.

2. A radio communication method for a terminal, comprising:
receiving an activation command for a secondary cell;
applying, when the terminal receives the activation command in slot n in a cell, a first action corresponding to a reception of the activation command, at a timing later than slot n+k in the cell,
wherein a value of the k is based on a subcarrier spacing of another cell where a physical uplink control channel (PUCCH) for the secondary cell to be activated by the activation command is transmitted and indicates a number of slots each having a same subcarrier spacing as the slot n in the cell,
wherein the secondary cell is not a primary secondary cell,
wherein the first action corresponding to the reception of the activation command includes another PUCCH transmission on the secondary cell; and
applying, in an earliest slot after the slot n+k that is a first slot after the slot n+k and that does not overlap with the slot n+k, a second action related to CSI reporting of a serving cell which is not active.

3. A system comprising a terminal and a base station, wherein
the terminal comprises:
a receiver that receives an activation command for a secondary cell; and
a processor that applies, when the receiver receives the activation command in slot n in a cell, a first action corresponding to a reception of the activation command, at a timing later than slot n+k in the cell,
wherein a value of the k is based on a subcarrier spacing of another cell where a physical uplink control channel (PUCCH) for the secondary cell to be activated by the activation command is transmitted and indicates a number of slots each having a same subcarrier spacing as the slot n in the cell,
wherein the secondary cell is not a primary secondary cell,
wherein the first action corresponding to the reception of the activation command includes another PUCCH transmission on the secondary cell, and
wherein the processor applies, in an earliest slot after the slot n+k that is a first slot after the slot n+k and that does not overlap with the slot n+k, a second action related to CSI reporting of a serving cell which is not active, and
the base station comprises:
a transmitter that transmits, to the terminal, the activation command.

* * * * *